(12) United States Patent
Parenteau et al.

(10) Patent No.: US 7,750,913 B1
(45) Date of Patent: Jul. 6, 2010

(54) SYSTEM AND METHOD FOR IMPLEMENTING GRAPHICS PROCESSING UNIT SHADER PROGRAMS USING SNIPPETS

(75) Inventors: Alexandre S. Parenteau, San Jose, CA (US); Cynthia W. Lau, Campbell, CA (US)

(73) Assignee: Adobe Systems Incorporated, San Jose, CA (US)

( * ) Notice: Subject to any disclaimer, the term of this patent is extended or adjusted under 35 U.S.C. 154(b) by 904 days.

(21) Appl. No.: 11/586,269

(22) Filed: Oct. 24, 2006

(51) Int. Cl.
*G06F 15/16* (2006.01)
*G06T 15/50* (2006.01)
*G06T 15/60* (2006.01)

(52) U.S. Cl. ...................... 345/502; 345/426
(58) Field of Classification Search ................ 345/501, 345/426, 502, 519
See application file for complete search history.

(56) References Cited

U.S. PATENT DOCUMENTS

| 6,985,151 | B1 | 1/2006 | Rui et al. |
| 7,015,909 | B1 * | 3/2006 | Morgan, III et al. ......... 345/426 |
| 7,159,212 | B2 | 1/2007 | Schenek et al. |
| 7,218,291 | B2 | 5/2007 | Abdalla et al. |
| 7,463,259 | B1 * | 12/2008 | Kolb et al. ................... 345/426 |
| 7,542,043 | B1 * | 6/2009 | Lindholm et al. ........... 345/506 |
| 2004/0003370 | A1 | 1/2004 | Schenk et al. |
| 2006/0082577 | A1 | 4/2006 | Carter |
| 2006/0098018 | A1 | 5/2006 | Tarditi et al. |
| 2006/0098019 | A1 | 5/2006 | Tarditi et al. |

* cited by examiner

*Primary Examiner*—Kee M Tung
*Assistant Examiner*—Jacinta Crawford
(74) *Attorney, Agent, or Firm*—Robert C Kowert; Meyertons, Hood, Kivlin, Kowert & Goetzel, P.C.

(57) ABSTRACT

Shader programs that execute on graphics processing units (GPUs), such as vertex and pixel shaders may be generated by defining individual shader snippets. Each snippet may represent and/or specifies a particular shader operation. In one embodiment, each snippet may indicate a particular vertex shader operation, a particular pixel (or fragment) shader operation, or both. Various combinations of these snippets may then be combined to create more complex shader programs. A shader snippet framework may be configured to receive information specifying individual snippets, as well as the combinations of snippets representing various shader programs. The framework may define such shader programs using only the identifiers for the various snippets and thus a shader program, as described herein, may not include any actual code, but instead may refer to an ordered list of snippets. At runtime, the snippets are then instantiated and executed to execute the shader program.

25 Claims, 11 Drawing Sheets

SYSTEM AND METHOD FOR IMPLEMENTING GRAPHICS PROCESSING UNIT SHADER PROGRAMS USING SNIPPETS

BACKGROUND

1. Field of the Invention

The present invention is directed to computer systems. More particularly, it is directed to graphics programming and processing.

2. Description of the Related Art

Rendering an image using a graphics processing unit (GPU) frequently involves the use of custom programmed "shader" programs executing on the GPU. Shader programs are generally coded individually for different GPU platforms application programming interfaces (APIs) or shader programming languages, such as DirectX, OpenGL, High Level Shader Language (HLSL), OpenGL Shader Language (GLSL), etc. Additionally, an application would include several (or many) individual shader programs for applying various graphic operations when rendering an image. Graphic applications frequently must support multiple platform APIs (also known as shader programming languages) in order to support the numerous types of GPU hardware that exist. Thus, developing a graphic application may require custom programming of various versions of the same shader program in order to support the different platform APIs.

Different GPU platform APIs, such as Direct X or OpenGL, provide different APIs in order to write shader programs. Sometimes the program can be compiled at runtime by the API or driver. Sometimes it is possible to pre-compile shader programs as bytecode, and only run the assembler at runtime. For a complex application that uses a large set of shader programs for various different APIs and platforms may have to be created and maintained. For example, using OpenGL, the application might sometimes have to provide several sets of the same shader programs to support different available versions of OpenGL. Another example is DirectX 9 that allows the shader programs to be either compiled or assembled at runtime, leading to different formats and runtime images for the application to handle. Thus, an application that supports both OpenGL and DirectX 9 may need to include several different versions of every shader program used by the application.

SUMMARY

Shader programs, such as vertex shaders and pixel shaders may be generated by defining a plurality of individual shader snippets, each of which identifies, represents and/or specifies a particular shader operation. In one embodiment, each snippet may include a particular vertex shader operation, a particular pixel (or fragment) shader operation, or both. Various combinations of these snippets may then be combined to create more complex shader programs. In some embodiments, the individual shader operations specified in a shader snippet may include or involve multiple operations or graphics API calls, but in general a shader snippet may be defined to perform a single task, such as performing a particular vertex transformation. Even though performing the transformation may involve multiple calls, the snippet itself may be considered to perform a single shader operation or task. For example, each snippet may be defined to perform a common, individual shader task.

A shader snippet framework may be configured to receive information specifying individual snippets, as well as the combinations of snippets representing various shader programs. For example, more complex shader programs may be defined by specifying an ordered list of snippets to be executed together. The framework may define such shader programs as snippet assemblies using only the identifiers for the various snippets and thus a snippet assembly, as described herein, may not include any actual code, but instead may simply refer to a set of snippets, e.g., an ordered list of snippets. A shader program may also be coded, and possibly compiled, for use by a graphics application. At runtime, the shader programs may then be instantiated and executed.

The snippet framework may include a program configured to generate a snippet store containing the definitions of the snippets and including parameters for performing the operations represented by the snippets. For example, the framework may generate a computer file containing either source code (such as C, C++, Java or Assembler source), byte code or other executable code that includes the snippet definitions. Additionally, the snippet store may include a table of parameters for the snippets.

In some embodiments, the framework may also receive information indicating a number of target shader language or platform APIs (such as various versions of DirectX, OpenGL, HLSL, etc.) that the snippets should support and may include multiple definitions (and possible multiple set of parameters) in the snippet store for each snippet to support the indicated target platform APIs. In other embodiments, however, the snippet store may only store an abstracted version of the snippets and different versions for different shader programming languages may be generated and compiled at runtime.

The framework may also be configured to generate a source file including definitions of shader objects, each configured to load and execute a particular combination of snippets as a shader program on a GPU. A graphics application may then instantiate and execute one or more of the snippets from the snippet store in order to perform all the operations of the shader program. In some embodiments, the framework may generate shader object templates to ease the generation of different shader objects for the different targeted platform API. In general, a shader object may include platform specific code configured to execute shader programs according to the particular platform API or shader programming language.

Shader snippets may be configured to execute on shader processors of a GPU and different snippets (e.g. vertex, geometry and pixel shaders) may be configured to execute in parallel on multiple shader processors of the GPU, according to some embodiments. Additionally, in some embodiments, multiple instances of a single shader snippet may be execute in parallel.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
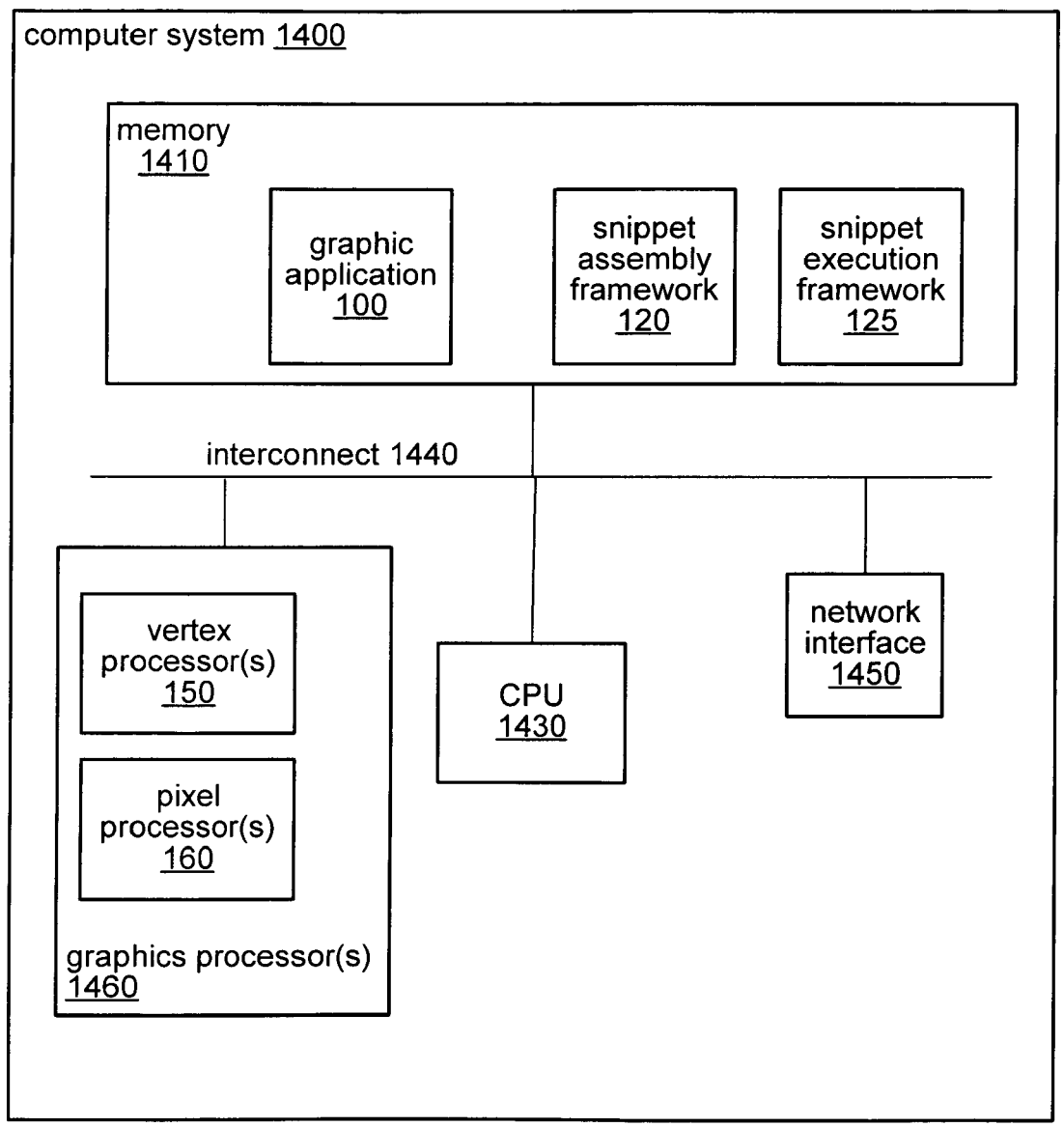
FIG. 1 is a block diagram illustrating one embodiment of a computer system capable of implementing a shader snippet framework, as described herein.

Shader programs, such as vertex shaders and pixel shaders may be generated by defining a plurality of individual shader snippets, each of which identifies, represents and/or specifies a particular shader operation. FIG. 1 is a block diagram illustrating one embodiments of a computer system 1400 suitable for implementing a shader snippet framework configured for generating shader programs using individual shader snippets, as described herein.

A graphics processing unit or GPU is a dedicated graphics-rendering device for a personal computer, workstation or game console. Modern GPUs may be very efficient at manipulating and displaying computer graphics and their highly parallel structure may make them more effective than typical central processing units (CPUs) for a range of complex graphical algorithms. For example, a GPU may implement a number of graphics primitive operations in a way that makes executing them must faster than drawing directly to the screen with the host CPU. Many GPUs have programmable shading as part of their capabilities. For example, each pixel may be processed by a short program that could include additional image textures as inputs, and each geometric vertex could likewise be processed by a short program before it was projected onto the screen. These pixel and vertex programs may be called 'shaders' and may implement looping and lengthy floating-point math, and in general are quickly becoming as flexible as CPUs and orders of magnitude faster for image-array operations. GPUs may include support for programmable shaders that can manipulate and vertices and textures with many of the same operations supported by CPUs, oversampling and interpolation techniques to reduce aliasing, and very high-precision color spaces.

As noted above, shader programs, such as vertex shaders and pixel shaders may be generated by defining a plurality of individual shader snippets, each of which identifies, represents and/or specifies a particular shader operation or task. The particular task or operation may include multiple source code statements or function calls, but may indicate or represent a single graphic task or operation. For example, antialiasing a line or transforming a vertex, or applying a particular color gradient may each be represented by a single shader snippet. In one embodiment, each snippet may indicate a particular vertex shader operation, a particular pixel (or fragment) shader operation, or both. Various combinations of these snippets may then be combined to create more complex shader programs. Thus, a shader program, as described herein, may not include any actual snippet source code itself, but instead, may reference one or more individual shader snippets, such as by calling a function defined by a snippet, that, when executed, perform the operations of the shader program. For example, one shader program may reference a shader snippet that performs a transformation on the vertices of a 3D graphics object and another shader snippet that performs applies a color gradient to one of the faces of the object. Instead of having the source code necessary to perform the actual transformation and color gradient, the shader program may include the identifiers of the individual shader snippets and code to load, instantiate and/or execute the shader snippets. The code to actually perform the transformation and to apply the color gradient may only reside within the individual shader snippets.

Thus, instead of treating a shader program as a single piece of code, as is traditionally done, the shader snippet framework described herein may treat a shader program as an array of shader snippets that together constitute the complete shader program. In some embodiments, this may avoid performing multiple passes of shaders when rendering operations that are conceptionally dissociated. Snippet shaders may relate to each other by setting common local variables and may execute in the same global scope. For example, to operations to swizzle an image, convert a CMYK image to sRGBA, apply a bit of mask image, and multiply by a constant alpha may each be individual shader snippets. Thus, a shader snippet framework may allow the individual snippets to be joined into a single shader program. Additionally, by building shader programs out of smaller individual shader snippets, different operations (represented by snippets) may be substituted for existing operations in a shader program without having to re-write the entire shader (e.g. by specifying a different array of shader snippets).

One aspect of the shader snippet framework may be the ability to define "shader snippets" that represent different operations that may executed by a shader. Each shader snippet may define a vertex shader operation and/or a pixel shader operation as well as input/output parameters needed to perform those particular operations. For example, each snippet may include multiple sub-snippets, such as vertex sub-snippet and a pixel sub-snippet, according to one embodiment. Thus, a snippet may include a sub-snippet configured to execute on a particular processing unit (e.g. a vertex process or a pixel processor) of a GPU. Some GPU hardware also includes geometry processing units and thus in some embodiments a shader snippet may include a geometry sub-snippet.

In general, a shader snippet may include one sub-snippet for each programmable processing unit of a target GPU. Shader snippets may be defined in any or all of the existing shader programming languages. As noted above, shader programs are generated by stringing together arrays of individual shader snippets. Thus, it may be possible to modify or add operations to shader programs without creating any duplication of shader code to perform individual operations.

GPUs, such as GPU 1460 may be implemented in a number of different physical forms. For example, GPU 1460 may take the form of a dedicated graphics card, an integrated graphics solution and/or a hybrid solution. GPU 1460 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers are most commonly interfaced through a non-standard and often proprietary slot due to size and weight constraints. Such ports may still be considered AGP or PCI express, even if they are not physically interchangeable with their counterparts. As illustrated in FIG. 1, memory 1410 may represent any of various types and arrangements of memory, including general purpose system RAM and/or dedication graphics or video memory.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU is extremely memory intensive, an integrated solution finds itself competing for the already slow system RAM with the CPU as it has no dedicated video memory. For instance, system RAM may experience a bandwidth between 2 GB/s and 8 GB/s, while most dedicated GPUs enjoy from 15 GB/s to 30 GB/s of bandwidth.

Hybrid solutions also share memory with the system memory, but have a smaller amount of memory on-board than discrete or dedicated graphics cards to make up for the high latency of system RAM.

Figure 2:
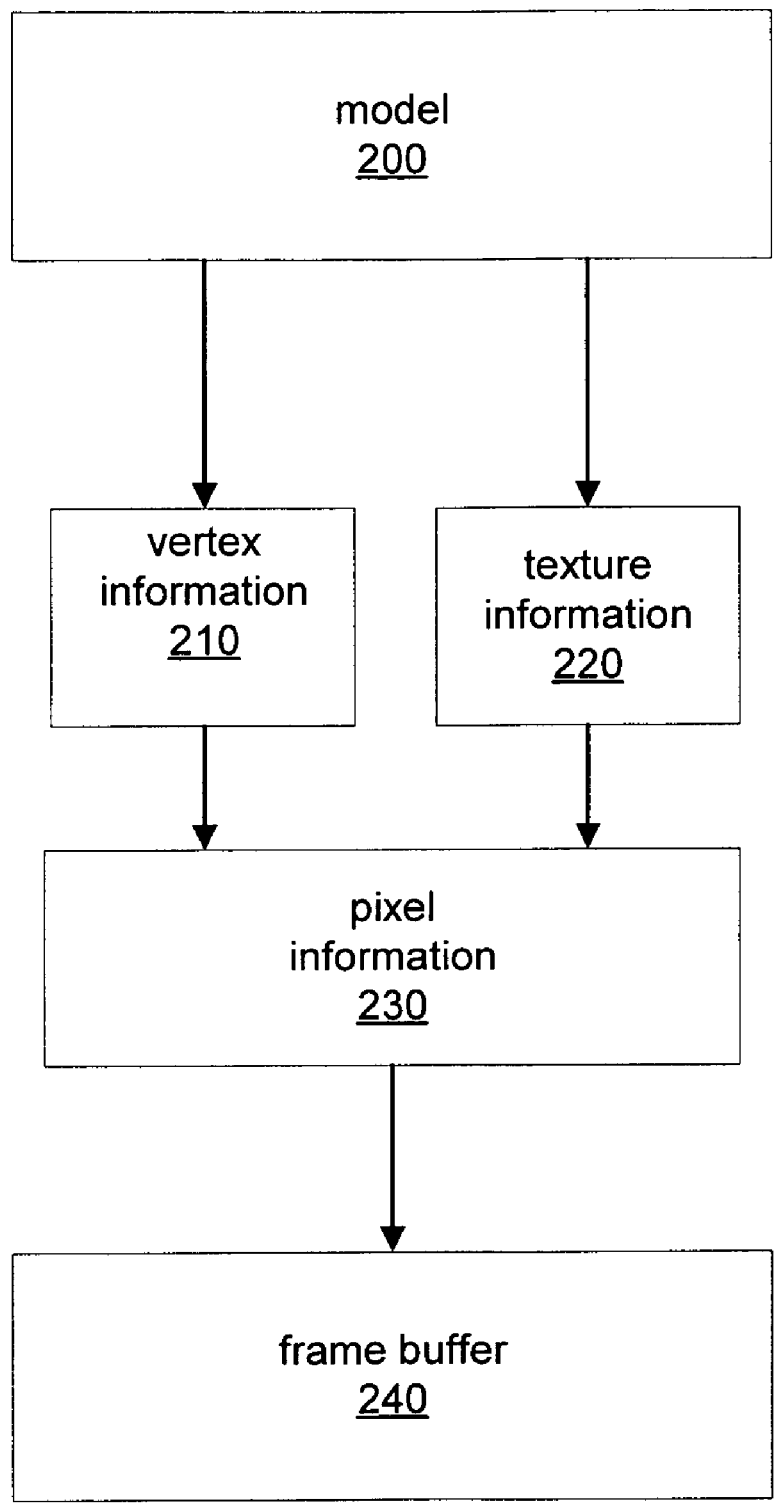
FIG. 2 is a block diagram illustrating the logic flow of rendering an image via a GPU.

A GPU may include programmable vertex and pixel and texture units. For example, FIG. 2 is a block diagram illustrating the logic flow of rendering an image via a GPU. As shown in FIG. 2, the model 200 of the graphics objects to be rendered is supplied from a graphics application executing on the CPU of a system and passes data to the vertex unit 210 and the texture unit 220. For example, graphics application 100, may call various functions of a graphics API, such as OpenGL or DirectX, that in turn instruct the various elements of the GPU to render the images.

Vertex unit 210 may describe the geometry of an object while texture unit 220 may specify the skin covering on an object and pixel unit 230 may deal with the view of an object. As noted above, vertex unit 210 and pixel unit 230 may be configured to execute specific vertex and pixel programs, called shaders. For instance, vertex unit 210 may accept vertex information such as position from the model through a vertex buffer. As the same time, texture unit 220 may receive surface information from the model. Both units may complete processing and generate output pixel unit 230. Pixel unit 230 may then complete the lighting and view processing and output the rendered image to frame buffer 240 for display. A frame buffer may be a video output device that drives a video display from a memory buffer containing a complete frame of data. The information in the buffer typically consists of color values for every pixel (point that can be displayed) on the screen.

Figure 3:
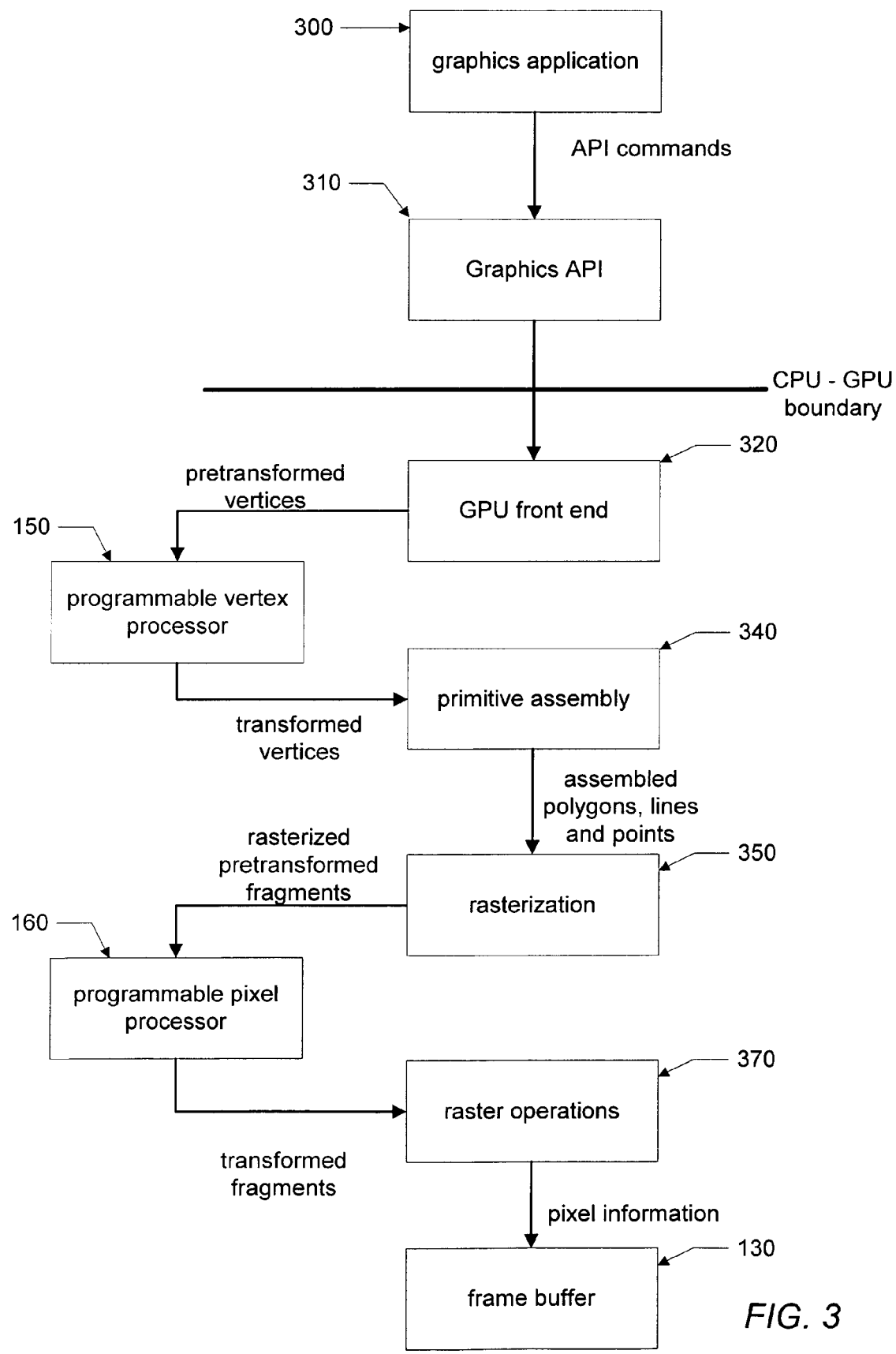
FIG. 3 is a block diagram illustrating the logical flow of functionality in a GPU pipeline, according to one embodiment.

3D graphics rendering involves numerous steps that are performed one after another. These steps can be thought of like an assembly line or pipeline. FIG. 3 is a block diagram illustrating one embodiment of the logical view of such a pipeline. A pipeline is a term used to describe the graphics card's architecture and it provides a generally accurate idea of the computing power of a graphics processor. There may be different pipelines within a graphics processor as there may be separate functions being performed at any given time. The pipeline may be broken down into two main stages: the geometry processing stage and the rendering stage. Geometry processing may involve calculations that modify or, in some cases, create new data for vertices. In the rendering stage of the pipeline, a pixel shader may be used to replace previously fixed function texturing, filtering and blending. A programmable shader, such as a pixel or vertex shader, may be considered a piece of code configured to perform different kinds of operations on GPU, including T&L, texturing, etc.

An important advantage of the modern GPU is the ability to be programmed through languages like OpenGL, DirectX or C for Graphics (CG). DirectX and OpenGL are graphics APIs or Application Programming Interfaces. Before 3D graphics APIs, each graphics card company had its own proprietary method of making their graphics card work. Developers were forced to program with vendor-specific paths for each and every type of graphics card they wished to support. This was naturally a very costly and inefficient approach. To solve this problem, 3D graphics APIs were created, so that developers could program their software to be compliant with the API and not with each independent piece of hardware. The responsibility of compatibility was then shifted to the graphics card manufacturers who had to ensure that their drivers where compatible with the API.

There emerged two different APIs, DirectX and OpenGL, both of which are used today. Initially, the APIs were relatively simple. Developers had to mix-and-match visual effects from an unchanging list of pre-programmed effects. There are three types of graphics interfaces currently in use. PCI, AGP, and PCI Express. Different graphics interfaces allow for different amounts of bandwidth and more bandwidth generally means better performance. It is important to note that contemporary graphics cards are only capable of using so much bandwidth. At a certain point if the interface bandwidth is sufficient, the interface no longer remains a bottleneck.

The slowest graphics card bus, the Peripheral Components Interconnect (PCI) bus is generally detrimental to graphics card performance. Accelerated Graphics Port (CGP) is much better, but even ACP 1.0 and 2× specifications can limit performance. However, AGP 4× and 8× specification begin to approach the practical limit of bandwidth required for contemporary graphics cards.

The newest and highest-bandwidth interconnect is the PCI Express bus. New graphics cards typically use the PCI Express ×16 specification that combines 16 separate PCI Express links, or lanes, to reach as much as 4 GB/s bandwidth. PCI Express offers this bandwidth both for uploading data to the computer and downloading to the graphics cards.

Data communicated between the graphics processing unit and the rest of the computer may travel through the graphics card slot or other interface, such as interconnect 1440 of FIG. 1.

Custom shader programming allows developers to create truly custom visual effects for the first time. Thus, graphics application 300 may call various functions supplied by graphics API 310, such as DirectX or OpenGL, in order to utilize the GPU to render a graphic image.

As noted above, vertex processor 150 and pixel processor 160 may be user programmable. A program executed by vertex processor 150 and/or pixel processor 160 may be called a 'shader'. Vertex shaders may deform or transform 3D elements.

A pixel processor, such as pixel processor 160, may be a component on the graphics chip devoted exclusively to pixel shader programs. Because pixels represent color values, pixel shaders may be used for all sorts of graphical effects. Pixel shaders may change pixel colors based on various types of input. For example, when the object is lit by a light source in a 3D scene in which some colors appear brighter while other colors create shadows, both the brighten objects and the shadows may be generated by changing various pixels' color information in a pixel shader. As noted above, a GPU may also include vertex processors, such as vertex processor 150, configured to execute vertex shaders that affect vertices.

A vertex shader may receive streams of vertex data from the graphics pipeline perform operations on the data and output the transformed vertex data to the graphics pipeline for further processing. For example, vertex processor 150 may receive pretransformed vertex data from GPU front end 320 and output transformed vertices to primitive assembly unit 340. Subsequently, the assembled triangle data (e.g. vertex data) may be sent to a rasterization unit 350. Pixel processor 160 may receive rasterized pretransformed pixel information, also called fragments, execute the applicable pixel shaders and output transformed fragments (pixel information) to a raster operations unit 370 that may then output the final pixel information to frame buffer 130. Raster operation processors (ROPs), such as raster operations unit 370, may be responsible for writing pixel data to memory.

Figure 4:
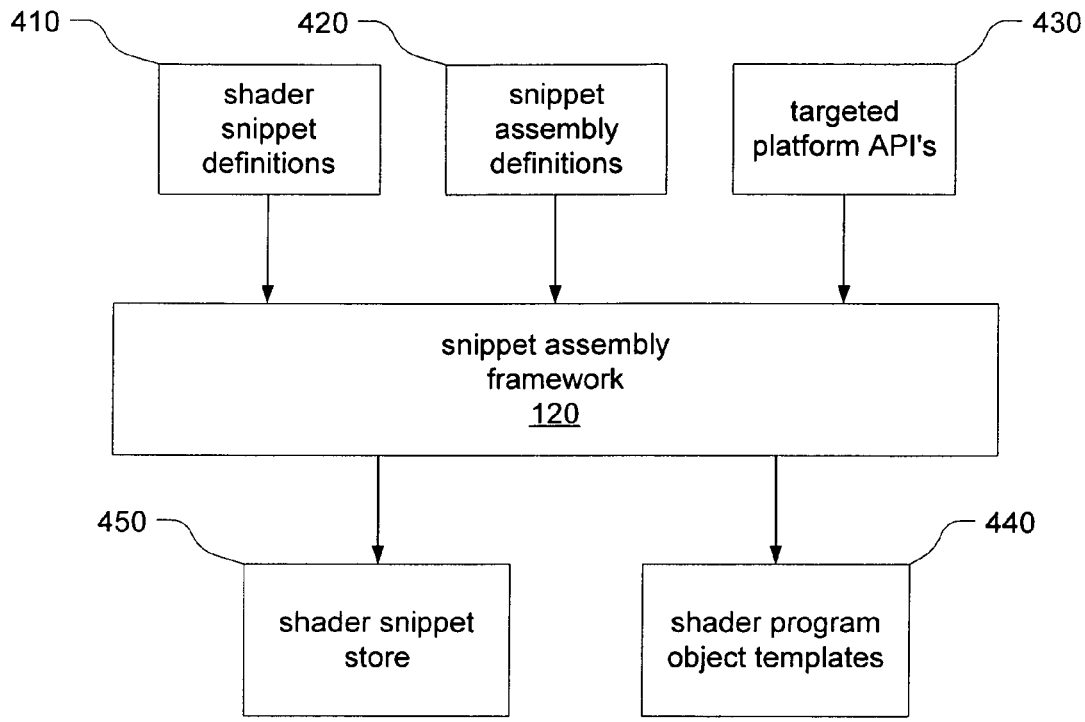
FIG. 4 is a block diagram illustrating the logical association of various object used by a shader snippet framework, in one embodiment.

FIG. 4 is a block diagram illustrating the logical association of inputs to and output of shader snippet assembly framework 120, according to one embodiment. For example, as described above, snippet assembly framework 120 may be configured to receive definitions of various shader snippets (including parameters to the snippets), definitions of shader programs that use various combinations of the shader snippets as well as a list of targeted platform APIs for shader programming languages to be supported. As illustrated in FIG. 4, a shader snippet framework, such a shader snippet assembly framework 120, may be configured to receive information, such as from a programmer, specifying individual snippets, such as shader snippet definitions 410.

As illustrated in FIG. 1, described above, a snippet framework may include both a snippet assembly framework 120 and a snippet execution framework 125. While described herein mainly as two separate programs, in some embodiments, snippet assembly framework 120 and snippet execution framework 125 may be combined as a single program or framework. Thus, the two terms may be used interchangeable herein and any functionality attributed to or described as part of snippet assembly framework 120 may also be attributed to or part of snippet execution framework 125.

As noted above, a shader program may be developed using smaller shader snippets. In one embodiment each shader snippet may include two parts, a vertex shader snippet and a pixel (or fragment) shader snippet. As noted above, however, in other embodiments, each shader snippet may include additional parts, such as geometry sub-snippet. In general, each snippet may contain the same number of parts as the number of different programmable units (e.g. different shader processors) in a targeted GPU. For example, some snippets may be targeted to a GPU that includes vertex, pixel and geometry processors and thus those snippets may include a vertex sub-snippet, a pixel sub-snippet, and a geometry sub-snippet. Additionally, in some embodiments, one or other parts of a snippet may be empty. Thus, a shader snippet may include only a vertex snippet, only a pixel snippet or both, according to different embodiments. In some embodiments each part of the shader snippet may be represented by an abstract identifier of a particular shader function or task. For example, one shader snippet may represent a conversion from CMYK to sRGBA formats and may utilize an abstract identifier, such as "CMYK_TO_sRGBA" rather than an actual function call or source code to represent the conversion. Thus, snippet assembly framework 120 may create an abstraction layer over various existing shader programming languages (e.g. HLSL, GLSL, Cg, etc.) that allows the rest of the application to invoke shaders and set shader parameters without being concerned about which language or platform is being used.

A programmer may use snippet assembly framework 120 to design and specify individual shader snippets. In one embodiment, the programmer may not actually code the snippets, but instead may identify, such as via an abstraction layer or pseudo-language, the overall task or operation to be performed by the snippets. For instance, rather than design, specify or develop shader snippets using a particular GPU platform API, such as DirectX, OpenGL, HLSL, etc., snippet assembly framework 120 may be configured to allow a programmer to specify the functionality of a snippet using an abstract notation (or pseudo-language) representing the functionality available via any of the GPU platform API's. For example, each type of task that might be performed by shader program, such as a vertex transformation or color gradient, may be identified in an abstract manner, such as by using human language identifiers (e.g. "transform" and "gradient", etc) or by using alpha-numerical identifiers (e.g. "transform1", "axial_gradient_type_2", etc.). Thus, rather than developing the snippet by hand coding using specific API calls, a programmer may indicate higher level (abstract) functionality for the snippet. In other words, a programmer may generate a transform vertex shader snippet by indicating the particular transformation without worrying about the actual code necessary to implement that transformation in each of the different platform APIs (e.g., DirectX, OpenGL, HLSL).

Shader snippet framework 120 may also be configured to allow the programmer to specify the parameters to be used when executing a shader snippet. As with snippet definition, shader snippet framework 120 may be configured to use identifiers for snippet parameters common to multiple platform APIs. For example, virtually all shader programming language and APIs have a parameter that represents the main world view projection, but the individual APIs' representations of that parameter may vary. Thus, shader snippet framework 120 may provide an identifier for the main world view projection to allow a programmer to specify this parameter without having to worry about how different platform API's represent it. For example, when hand coding a snippet, the programmer may utilize certain coding conventions recognized by snippet assembly framework 120 to indicate language elements (e.g. parameters, types, variables, functions, etc.) that are supported differently by different shader programming languages. For instance, the programmer may use all capital letters to refer to a variable type that is supported in multiple shader programming languages but that is supported differently among those languages. When storing a snippet definition, shader snippet framework 120 may store indications of the parameters for each snippet with each respective snippet definition.

In some embodiments, shader snippet definitions 410 may represent separate text files created by a programmer and input into shader snippet framework 120. For example, in one embodiment a programmer may create different files containing the definitions for vertex and pixel sub-snippets. In another embodiment, a single text file may include the various definitions and the individual definitions may be parsed out of the text file by snippet framework 120. In other embodiments, however, snippet assembly framework 120 may implement a user interface allowing the user to define various shader snippets. For example, shader snippet framework 120 may be configured to display a list of various pixel shader operations, such as replacing, modulating, blending or combination a pixel source with a pixel destination. A programmer may be able to define a shader snippet by selecting one of the displayed pixel shader operations and specifying appropriate parameters.

As noted above, snippet assembly framework 120 may be configured to receive information defining multiple shader snippets. In general, when using shader snippet framework 120 to develop a graphics application, a programmer may define all of the individual snippets that may be required by the graphics application. Shader snippet framework 120 may also be configured to receive information defining one or more shader programs, such as snippet assembly definitions 420. Individual shader programs may be defined by indicating in a snippet assembly one or more shader snippets to be executed by the shader program. Thus, each shader program may represent a particular combination of shader snippets.

Figure 5:
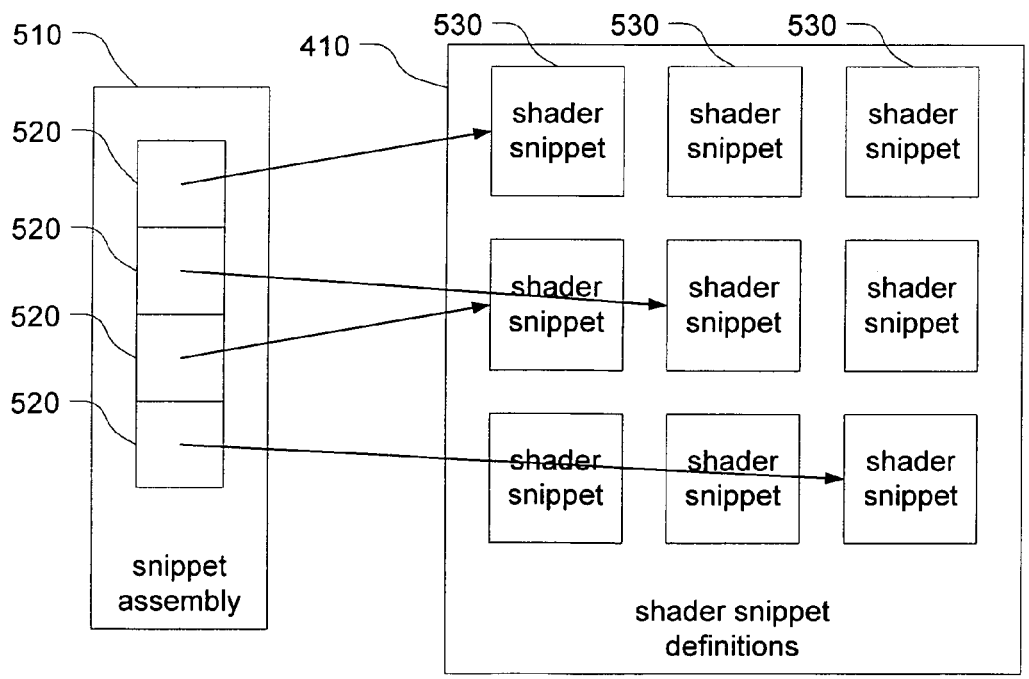
FIG. 5 is a block diagram illustrating, according to one embodiment, the logical association between a shader program and individual shader snippets, as described herein.

For example, FIG. 5 is a block diagram illustrating the logical association between a shader program definition and shader snippets, according to one embodiment. Snippet assembly 510 may reference four individual shader snippets 530, as illustrated in FIG. 5. As noted above, a shader program may indicate a particular combination of shader snippets. In the embodiment illustrated in FIG. 5, snippet assembly 510 includes four snippet identifiers 520, each indicating a single shader snippet 530. Thus, a shader program may define complex functionality involving multiple shader snippets and therefore multiple shader tasks or operations without actually including any platform API specific source code. Please note that while FIG. 5 illustrates only four snippets being included in shader program definition 510, in other embodiments, fewer or additional snippets may be included in snippet assemblies. Additionally, multiple snippet assemblies may include the same shader snippet and a single snippet assembly may include the same snippet more than once, according to various embodiments.

Thus, using the a shader snippet framework, such as snippet assembly framework 120 and/or snippet execution framework 125, described herein, a programmer may specify individual shader snippets, shader programs representing combination of the snippets, and the target platforms to be supported by the shader programs and snippets.

In some embodiments, snippet assembly framework 120 may be configured to generate (automatically) the specific code necessary to implement a shader snippet in one or more of the platform APIs. For example, snippet assembly framework 120 may have various sets of source code in the various platform APIs that may be used to generate the source code for individual shader snippets based on the specific operation identified by the programmer for that snippet. For example, snippet assembly framework 120 may include standard code for applying a color gradient in various shader programming languages and/or platform APIs.

Referring again to FIG. 4, snippet assembly framework 120 may also be configured to generate a snippet store 450 containing the snippets and including parameters for performing the shader operations of the snippets. For example, the framework may generate a computer file containing either source code (such as C, C++, Java or Assembler source) byte code or other executable code that includes the snippet definitions. Such a source file may include low-level descriptions of shader snippets, assembly versions of the snippets, fast routing tables for the snippet parameters, and different versions of snippets for different shader models, languages and/or platform APIs, according to various embodiments. The performance of shader programs frequently depends on the ability for the runtime to quickly load new shader programs to the GPU and to quickly change the input parameters of the shader programs. Therefore, it may be preferable is some situations to use the lowest level code and thus avoid having to compile shader code at runtime. Thus in some embodiments, snippet assembly framework 120 may be configured to store both uncompiled source code implementations and pre-compiled (or assembled) low-level code implementations of snippets.

Additionally, snippet assembly framework 120 may be configured to generate specialized code based on various GPU capabilities and thus may include different versions of snippet code for different GPU versions in order to take advantage of differing GPU capabilities. Snippet assembly framework 120 may also be configured to generate source code for loading and executing the shader snippets on a GPU. For example, snippet assembly framework 120 may generate source code for loading and instantiating snippet code objects, loading snippet code onto a GPU and/or executing snippet code on a GPU shader processor.

In some embodiments, a snippet framework may also receive information indicating a number of target shader programming languages and/or platform APIs (such as various versions of DirectX, OpenGL, HLSL, etc.) that the snippets should support and may generate multiple implementations (and possible multiple set of parameters) for each snippet to support the indicated target platform APIs. For example, snippet assembly framework 120 in FIG. 4 may receive targeted platform API's 430 identifying one or more shader programming languages, models and/or platform API versions to be supported by the snippets. Thus, in one embodiment, shader snippet framework 120 may be configured to generate a shader snippet store 450 that includes multiple versions of each snippet and/or shader program specified by the programmer that correspond to the different target shader programming languages and/or platform APIs identified by the programmer. For example, a programmer may have designed a vertex transformation snippet and identified DirectX version 8, DirectX version 9, OpenGL 1.4 and OpenGL 2.0 as target platform APIs. Thus, in the above example, snippet framework 120 may, according to one embodiment, generate a snippet store that includes four different versions of the vertex transformation snippet, one for each targeted platform API. In some embodiments, snippet assembly framework 120 may also generate four different versions of a shader program, one for each targeted platform API.

Snippet assembly framework 120 may be configured to receive information indicating targeted platform API's in various manner, according to different embodiments. For example, in one embodiment shader snippet framework may import a file in which a programmer indicated one or more targeted platform APIs. In another embodiment, shader snippet assembly framework 120 may be configured to present user interface via which the user may input, select, or otherwise indicate various targeted platform APIs. For instance, shader snippet assembly framework 120 may display a list of supported APIs and allow the user to select one or more of the APIs to be supported.

While described herein mainly in reference to automatically generating the source code for shader programs, in some embodiments snippet assembly framework 120 may be configured to allow a user to manually code or modify shader programs. Thus, in some embodiments, a programmer may rely on snippet assembly framework 120 to automatically generate the actual source code for a shader program, in other embodiments, the programmer may be able to hand optimize the source code for a shader program.

Snippet assembly framework 120 and/or snippet execution framework 125 may also be configured to generate a source file including implementations of shader program objects or object templates, each configured to load and execute a particular combination of snippets as a shader program on a GPU. Snippet execution framework 120 may generate code written the application's native language (such as C, C++, Java, etc.), which may provide a front end allowing instantiation of the various shader programs, the filling of parameters, and providing runtime assistance in order to check the validity of the shader programs, compile them if necessary, bind them, cache them, etc. For instance, snippet execution framework 125 may be configured to generate shader program object templates 440 in one embodiment illustrated by FIG. 4.

In some embodiments, shader program object templates 440 may represent a source code module to be compiled and/or linked into a graphics application and may function as a "front end" for instantiating and executing shader programs and shader snippets. For example, snippet execution framework 125 may represent the collection of source code and/or object library providing the "front end" functionality for instantiating and executing shader programs. The graphics application may then instantiate and execute one or more of the snippets from the snippet store in order to perform all the operations of the shader program. In some embodiments, snippet assembly framework 120 and/or snippet execution framework 125 may generate shader object templates 450 to ease the generation of different shader objects for the different targeted platform API. In general, a shader object or object template may include platform specific code configured to execute snippets according to the particular platform API.

The snippet store may also include the parameters to execute a particular snippet according to a particular target platform API and a shader object may load the parameters for a particular snippet from the snippet store and use those parameters when executing the snippet.

While a graphics application may partially execute on a CPU, shader programs and shader snippets may be configured to execute on a GPU. Specifically, shader snippets may be configured to execute on vertex and/or pixel processors (also known as fragment processors) of a GPU and multiple copies of snippets and/or shader programs may be configured to execute in parallel on multiple vertex and/or pixel processors of a GPU, according to some embodiments. Additionally, in some embodiments, multiple shader objects may execute their respective snippets on individual shader processors of a GPU, where the shader programs may execute in parallel.

Snippet assembly framework 120 may, in some embodiments, generate a snippet store 450 by creating a program source file including definitions of the individual snippets and parameters for the snippets. For example, in one embodiment, a source file configured to be compiled into a graphics application may be created by snippet assembly framework 120 that includes one or more arrays of snippet definitions. An example of such a source file, according to one embodiment is described in more detail below. Each snippet definition may include a name or other identifier for the snippet, a reference to an executable image of the snippet within the source file, and a reference to parameters for executing the snippet image stored in a parameter table, in one embodiment.

The following source code gives an example, using DirectX9 and pre-compiling to byte code, of one file that may be generated by shader snippet framework 120. The example used below includes a vertex shader program made up of two snippets "Axial" and "Default", named "Axial_Default" in the code. The "Axial" snippet uses the "invcolormatAxial" uniform variable to compute a radial gradient. The "Default" snippet shader uses "g_mWorldViewProjection1" and "g_mWorldViewProjection2" to perform a standard World->Viewport transformation.

These two shaders have been declared, analyzed and concatenated into the first framework to produce as many versions as needed (e.g., GLSL, DX9, HSSL byte code, Nvidia Cg, etc).

As illustrated in the example code below, a lookup table named dx9_vs_2_0_table may be used to aid in locating a particular shader program and/or snippet. At runtime, when the application desires to execute the shader program, front end code generated by shader snippet framework 120 may utilize the lookup table to locate the bytecode for the shader snippets and the parameters. The bytecode implementation is stored in the Axial_Default_vs_2_0 array and the parameters are stored in the Axial_Default_vs_2_0_constant array.

```
static size_t dx9_vs_2_0_size=16;
static dx9_table_type dx9_vs_2_0_table[ ]={
    {
    "Axial_Default", // sorted in alphabetical order
        // for easy binary search
    Axial_Default_vs_2_0,
    sizeof(Axial_Default_vs_2_0),
    Axial_Default_vs_2_0_consant,
    sizeof(Axial_Default_vs_2_0_constant),
    sizeof(dx9_constant_type)
    },
[ . . . ]
};
// the byte code
const DWORD Axial_Default_vs_2_0[ ]=
{
  0xfffe0200, 0x003afffe, 0x42415443, 0x0000001c,
    0x000000b0, 0xfffe0200, 0x00000003, 0x0000001c,
    0x00000100, 0x000000a9, 0x00000058, 0x00000002,
    0x00020001, 0x00000070, 0x00000000, 0x00000080,
    0x00010002, 0x00020001, 0x00000070, 0x00000000,
    0x00000098, 0x00020002, 0x00000001, 0x00000070,
    0x00000000, 0x576d5f67, 0x646c726f, 0x77656956,
    0x6a6f7250, 0x69746365, 0x00316e6f, 0x00030001,
    0x00040001, 0x00000001, 0x00000000, 0x576d5f67,
    0x646c726f, 0x77656956, 0x6a6f7250, 0x69746365,
    0x00326e6f, 0x63766e69, 0x726f6c6f, 0x417–4616d,
    0x6c616978, 0x5f737600, 0x00305f32, 0x7263694d,
    0x666f736f, 0x52282074, 0x33442029, 0x20395844,
```

```
    0x64616853, 0x43207265, 0x69706d6f, 0x2072656c,
    0x31312e39, 0x3931352e, 0x3030302e, 0xabab0030,
    0x0200001f, 0x80000000, 0x900f0000, 0x03000009,
    0xe0010000, 0xa0e40002, 0x90e40000, 0x03000009,
    0xc0010000, 0xa0e40000, 0x90e40000, 0x03000009,
    0xc0020000, 0xa0e40001, 0x90e40000, 0x02000001,
    0xc00c0000, 0x90e40000, 0x0000ffff
};

// the uniform constant lookup tables.

// The numbers are the size of the constant,

// and the index of the register dx9_constant_type Axial_Default_vs_2_0_constant[ ]={
    {"g_mWorldViewProjection1", 1, 0},
    {"g_mWorldViewProjection2", 1, 1},
    {"invcolormatAxial", 1, 2},
    }NULL, 0, 0}
};
```

Figure 6:
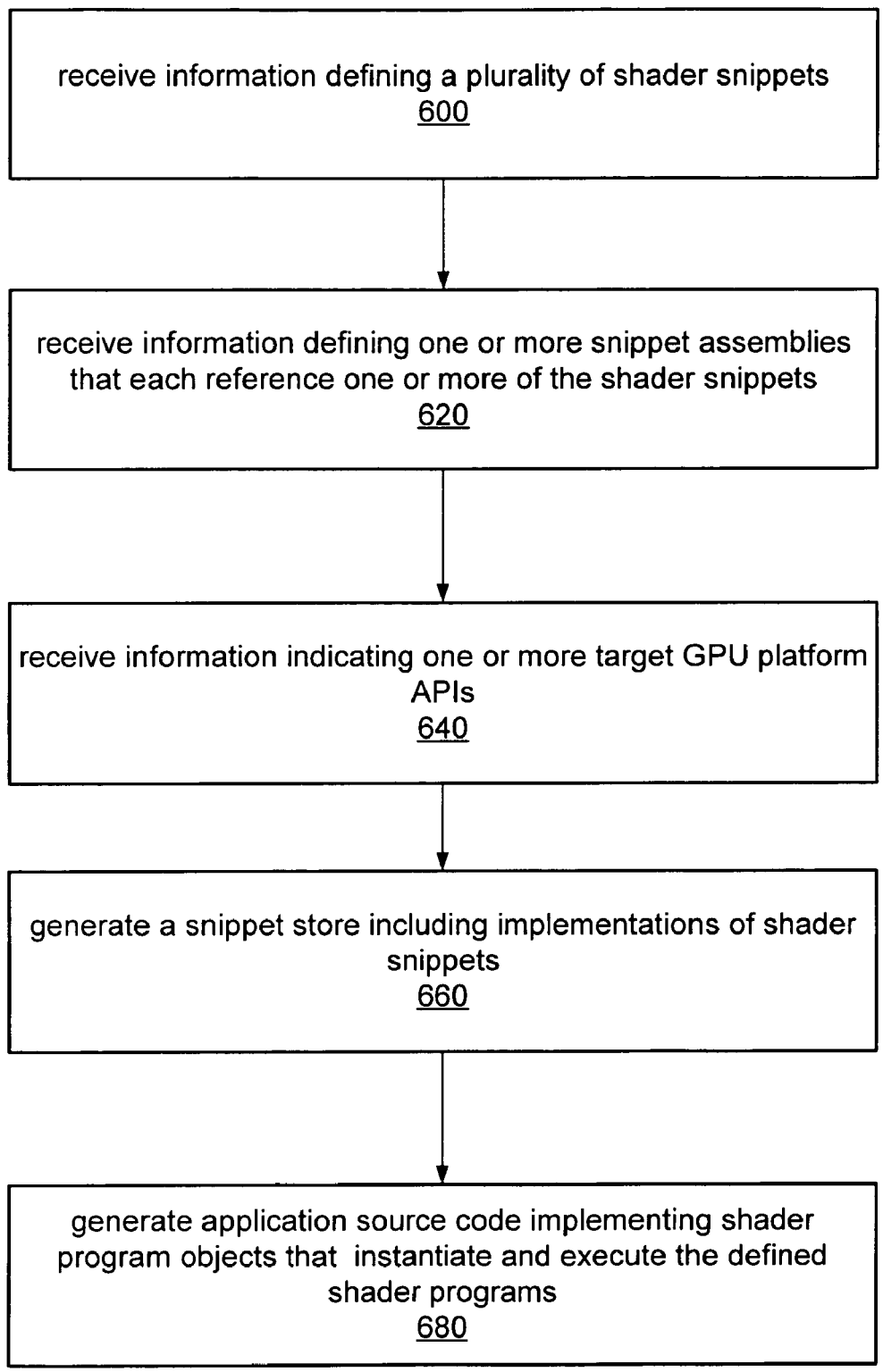
FIG. 6 is a flowchart illustrating one embodiment of a method for implementing shader programs using shader snippets as described herein.

FIG. 6 is a flowchart illustrating one embodiment of a method for generating shader programs using shader snippets, as described herein. As noted above, a shader snippet framework or other program may receive information defining a plurality of shadier snippets, as illustrated by block 600. As described above, a shader snippet framework, such as snippet assembly framework 120 may be configured to provide a user interface allowing a user to define various shader snippets, each representing a small portion of a shader program. In some embodiments, each shader snippet may represent only a single shader task but which may be implemented using multiple operations and or platform API calls. Additionally, snippet assembly framework 120 may be configured to identify the individual shader tasks and operations using an abstract representation of the functionality provided by shader programming languages and/or GPU platform APIs. Thus, rather than using actual source code or functional calls from a particular platform API to define the functionality to be performed by shader snippets, snippet assembly framework 120 may be configured to use high level, abstract representations of various shader tasks or actions that may be implemented on virtually any GPU hardware using virtually any shader programming language or platform API.

Snippet assembly framework 120 may also be configured to receive information defining one or more snippet assemblies that each reference one or more of the shader snippets, as illustrated by block 620. For example, as described above, snippet assembly framework 120 may be configured to display a user interface allowing a user to select from among the defined snippets to define various shader programs. A shader program may reference a particular combination of snippets and an order in which those snippets should be executed. Snippet assembly framework 120 may also be configured to allow a user to specify what parameters and how those parameters are to be used among and between those snippets in the context of a particular shader program. For example, snippet assembly framework 120 may be configured to allow a user to select from among various common parameters used by different shader programming languages and/or platform APIs.

Additionally, snippet assembly framework 120 may be configured to receive information indicating one or more target GPU platform APIs to be supported by the shader snippets and shader programs, as illustrated by block 640. For example, as described above, snippet assembly framework 120 may display a list of various shader programming languages and/or platform APIs from which a user may select ones that should be supported by the defined shader snippets and shader programs. Alternatively, in another embodiment, snippet assembly framework 120 may be configured to import a file created separately by a user that identifies the target platform APIs. In yet another embodiment, snippet assembly framework 120 may display a user interface allowing a user to select among various GPU hardware implementation styles and versions and snippet assembly framework 120 may determine from the select GPU hardware which shader programming languages and/or platform APIs should be supported. For instance, snippet assembly framework 120 may have knowledge of which platform APIs support which GPU implementations and therefore may be able to determine which APIs are needed to properly support different GPU implementations.

Snippet assembly framework 120 may then analyze the defined snippets, programs, parameters and targeted APIs in order to generate a snippet store, such as snippet store 450, including implementations of the defined shader snippets, as indicated by block 660. For example, snippet assembly framework 120 may generate various low-level descriptions of the defined snippets. Additionally, snippet framework 120 may include or generate, source code, assembly or byte code versions of one or more of the defined snippets, according to various embodiments. Thus, at runtime, implementations of some snippet may be compiled, links and executed, while implementations of other snippets may not have to be compiled because assembly or byte code versions of those snippets were included in the snippet store. Different versions (e.g. source code, assembly, byte code) of the same snippet may be included in the snippet store and different versions may be included for different snippets. For example, byte code versions of some snippets may be included while only source code implementations may be included for other snippets.

In some embodiments, snippet store 450 may represent one or more files at least some of which may be source code file to be included in or accessed by a graphics application. In other embodiments, snippet store 450 may represent a single file that may be included, compiled and/or linked with a graphics application. In some embodiments, the snippet store may also include definitions of the shader programs specifying particular combinations of snippets. As described above, a shader program may be defined by including identifications of shader snippets to be executed by the shader program. In other embodiments, snippets assembly framework 120 may be configured to generate separate source file(s) including code to implement computer programming language objects representing shader programs that instantiate and execute the defined shader programs, as illustrated by block 680. For instance, in one embodiment, shader snippet framework may generate a C+ header file containing C++ object definitions for shader objects. Snippet assembly framework 120 may also generate source code for the shader program objects that is configured to load and execute the particular combination of shader snippets to be executed by the shader program.

A shader program object may load or read the shader program definition from the snippet store and then instantiate and execute snippets that are specified in the particular shader program definition, according to one embodiment. In other embodiments, the shader objects may include the definitions of the shader program. In other words, the source code implementing a shader object may include code that is configured to load, instantiate and execute the combination shader snippets to implement the overall shader program.

In some embodiments, snippet assembly framework 120 may be configured to generate template objects, such as C++ or Java templates, that may be the basis for platform API specific (e.g. DirectX, OpenGL, etc). For example, snippet assembly framework 120 may be configured to generate a shader program object template that includes common source code for loading and instantiating individual snippets while also generating individual shader program objects derived from the template for implementing the platform API specific features of a snippet.

Figure 7:
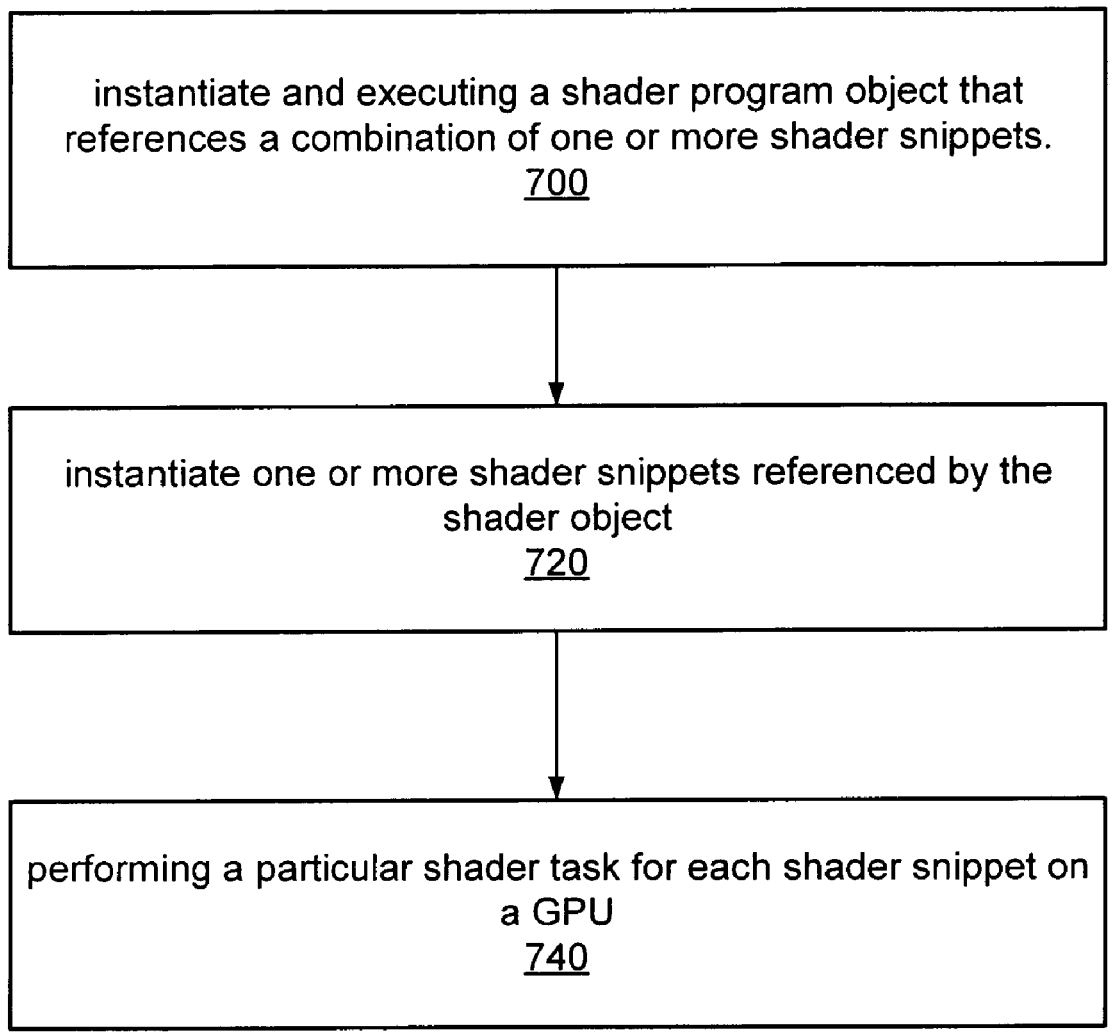
FIG. 7 is a flowchart illustrating one embodiment of a method for executing shader programs using shader snippets, as described herein.

FIG. 7 is a flowchart illustrating one embodiment of a method for executing a shader program using shader snippets, as described herein. As illustrated by block 700, a graphics program may instantiate and execute a shader program object that references a combination of one or more shader snippets. As described above, snippet assembly framework 120 may be configured to generate one or more source code files implementing programming objects, and/or object templates, representing user-defined shader programs. The source code file(s) may then be included, compiled and linked into the graphics application. During runtime when the application desires to execute a shader program, it may, in some embodiments, instantiate and execute one or more of the generated shader program objects.

The instantiated shader program object may include code to load or instantiate one or more shader snippets in order to perform the overall shader program functionality, as illustrated by block 720. For example, in one embodiment, a shader program object may include code configured to load various snippets from a snippet store, such as snippet store 450. In some embodiments, snippet store 450 may also represent source code that was compiled into the graphics application and thus an instantiated shader program object may include code to search through existing data structures to instantiate and execute shader snippets and the shader snippets themselves may be included in snippet objects. Alternatively, in other embodiments, a shader program object may load assembly or byte code implementations of snippets to be loaded onto the GPU for execution by shader processors. By executing the various shader snippet implementations on the GPU, the particular shader task, such as applying a bit mask image, multiplying a region by a constant alpha value, or performing a conversion from CMYK to sRGBA formats, may be performed, as illustrated by block 740.

Thus, at the application level, lists of objects representing an array of shader snippets are built, in some embodiments. Each shader snippet object may know its particular operation and therefore may know how to pull the necessary input parameter data from the application and may actually sets its own shader parameter values. By generating shader program object templates and shader snippet object templates (such as may be generated by snippet assembly framework 120 according to the C++ and Java programming languages) the different shader-compilation, shader-setting, and parameter setting operations may be abstracted across different shader language APIs.

Please note that while the methods illustrated by FIGS. 6 and 7 have been described in terms of certain divisions of functionality and actions, other embodiments, may implement the same methods using different numbers of actions and using different divisions of functionality.

Figure 8:
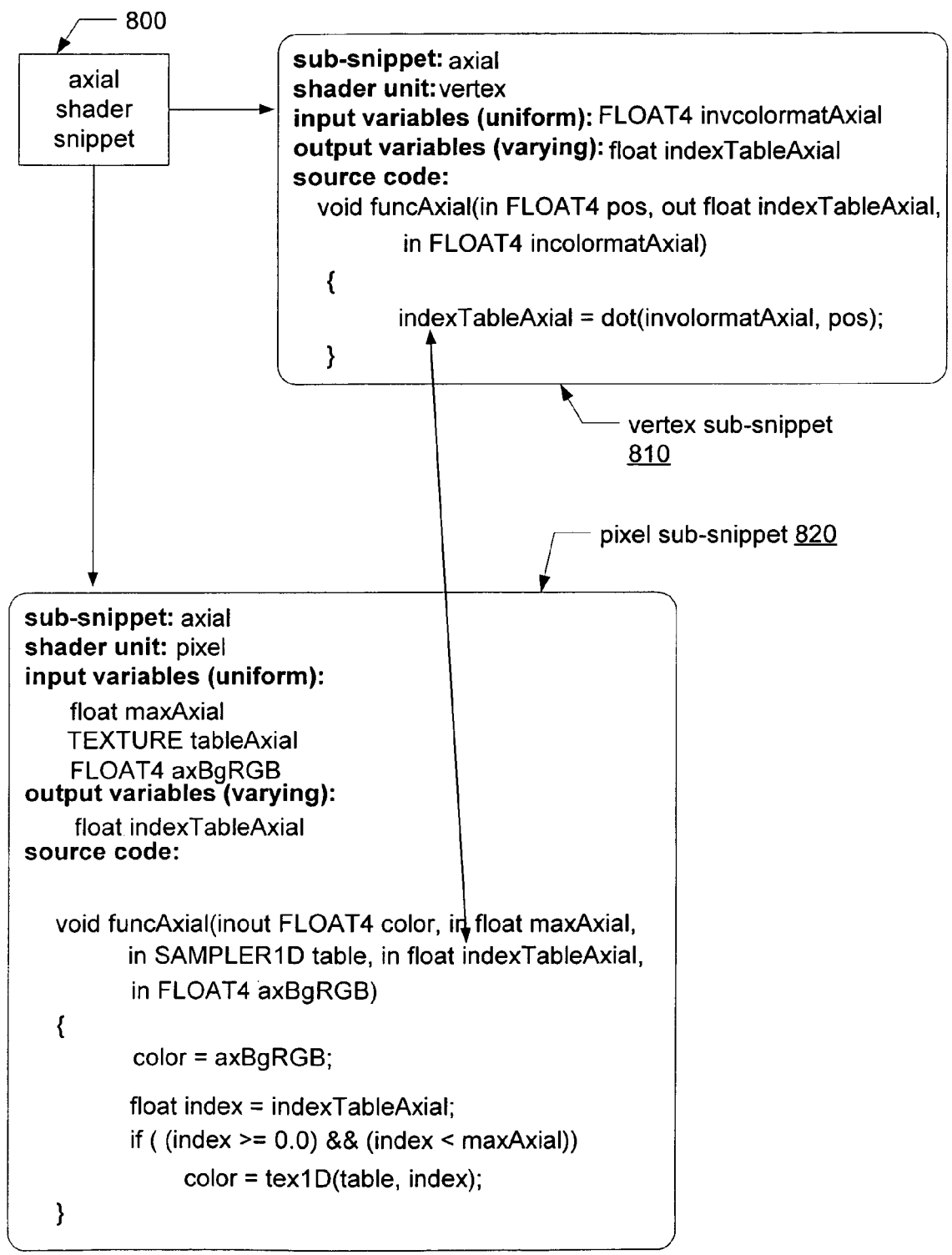
FIG. 8 is a block diagram illustrating the logical relationship between two sub-snippets of a shader snippet, according to one embodiment.

FIG. 8 is a block diagram illustrating the logical relationship between two sub-snippets of a shader snippet, according to one embodiment. As described above, each shader snippet may contain multiple sub-snippets. In the embodiment illustrated in FIG. 8, axial shader snippet 800 includes both a vertex sub-snippet 810 and a pixel sub-snippet 820. Generally, the sub-snippets of a snippet work together to perform the overall task of the snippet. For example, in the example shown in FIG. 8, the two sub-snippets may work together to compute a radial gradient. As noted above, when defining shader snippets and sub-snippets, the input and output parameters of the snippet and sub-snippets are defined. In some embodiments, as illustrated in FIG. 8, sub-snippets may be defined by a function, such as funcAxial illustrated in both vertex sub-snippet 810 and pixel sub-snippet 820. In addition, the data generated or used by a sub-snippet may also be used by another sub-snippet. For example, a variable indexTableAxial (identified by the doubled-headed arrow in FIG. 8) is used in both vertex sub-snippet 810 and pixel sub-snippet 820. In this specific example, indexTableAxial is given a value in vertex sub-snippet 810. Please note, in this example, vertex sub-snippet 810 execute prior to pixel sub-snippet 820. Pixel sub-snippet 820 then uses the variable indexTableAxial.

However, in some embodiments, some data used by more than one sub-snippet may also be affected by other processes executing in the same system. For example, vertex sub-snippet 810 may compute a series of points or vertices and store the results in indexTableAxial. However, another process executing on the same GPU make take indexTableAxial and interpolate additional data points based on those computed by vertex sub-snippet 810 prior to pixel sub-snippet executing. Thus, while data may be communicated between sub-snippets, other processes may also affect that data.

In some embodiments, a developer desiring to use axial shader snippet 800 may write the two funcAxial definitions, one in each of the sub-snippets. In other embodiments, axial shader snippet 800, as well as the definitions of vertex sub-snippet 810 and pixel sub-snippet 820 may be available as part of snippet store 450 and available to programmers. Furthermore, a developer may only have to write the functions for vertex sub-snippet 810 and pixel sub-snippet 820 once, but may be able to reuse them repeatedly in different snippet assemblies and shader programs.

FIG. 8 also illustrates one embodiment of the source code or pseudo code used to define sub-snippets, according to one embodiment. In some embodiments, a sub-snippet function may be written using a particular shader programming language, such as GLSL or HLSL. In other embodiments, such as illustrated in FIG. 8, sub-snippet functions may be defined or written using an abstraction of multiple shader programming languages. For example, the axial sub-snippets illustrated in FIG. 8 are defined using source code that includes some language elements that are common to multiple (such as all supported or targeted) shader programming languages and that also includes some language elements that are not supported in the same manner across the multiple shader programming languages. For example, the variables listed using all capitals, such as FLOAT4 and SAMPLER1D, are language elements that are supported in multiple shader programming languages but that are supported differently in different shader programming languages.

Thus, by using coding conventions that allow snippet framework 120 to differentiate those language elements that are supported directly by multiple shader programming languages from language elements that are supported differently by different shader programming language, a developer may be able to avoid writing different versions of a shader snippet for different shader programming languages. Instead, the developer may rely on the snippet framework to generate different versions for different shader programming languages by substituting language specific code for those language elements supported different by different shader programming languages. For instance, when generating multiple versions of a shader program that includes the pixel subs-snippet 820, snippet framework 120 may replace the FLOAT4 term with a language specific variable type for representing a 4-byte floating-point number. Additionally, snippet framework 120 may replace "FLOAT4" with different language specific variable types when using different shader programming languages.

Figure 9:
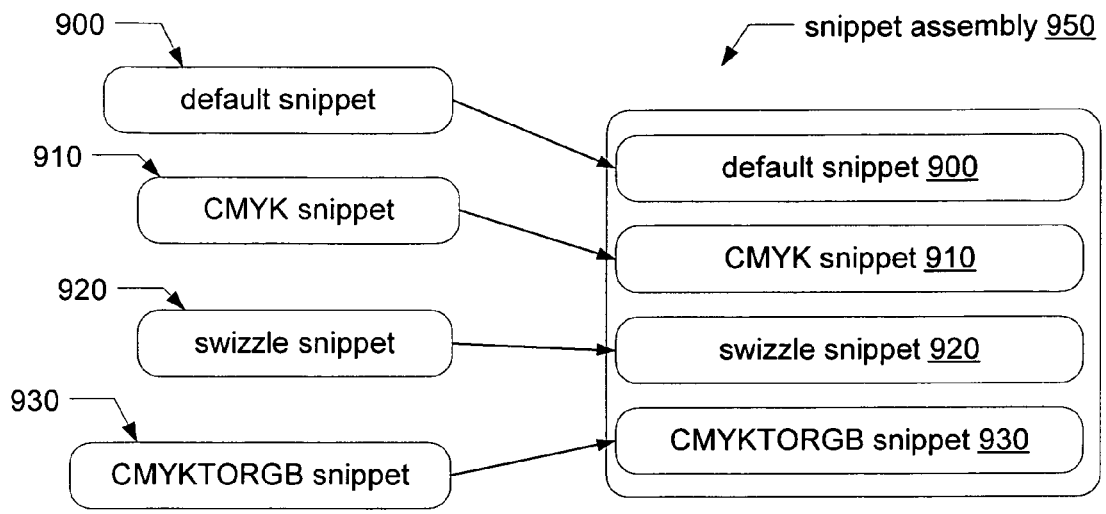
FIG. 9 is a block diagram illustrating, in one embodiment, a snippet assembly of four snippets.
Figure 10:
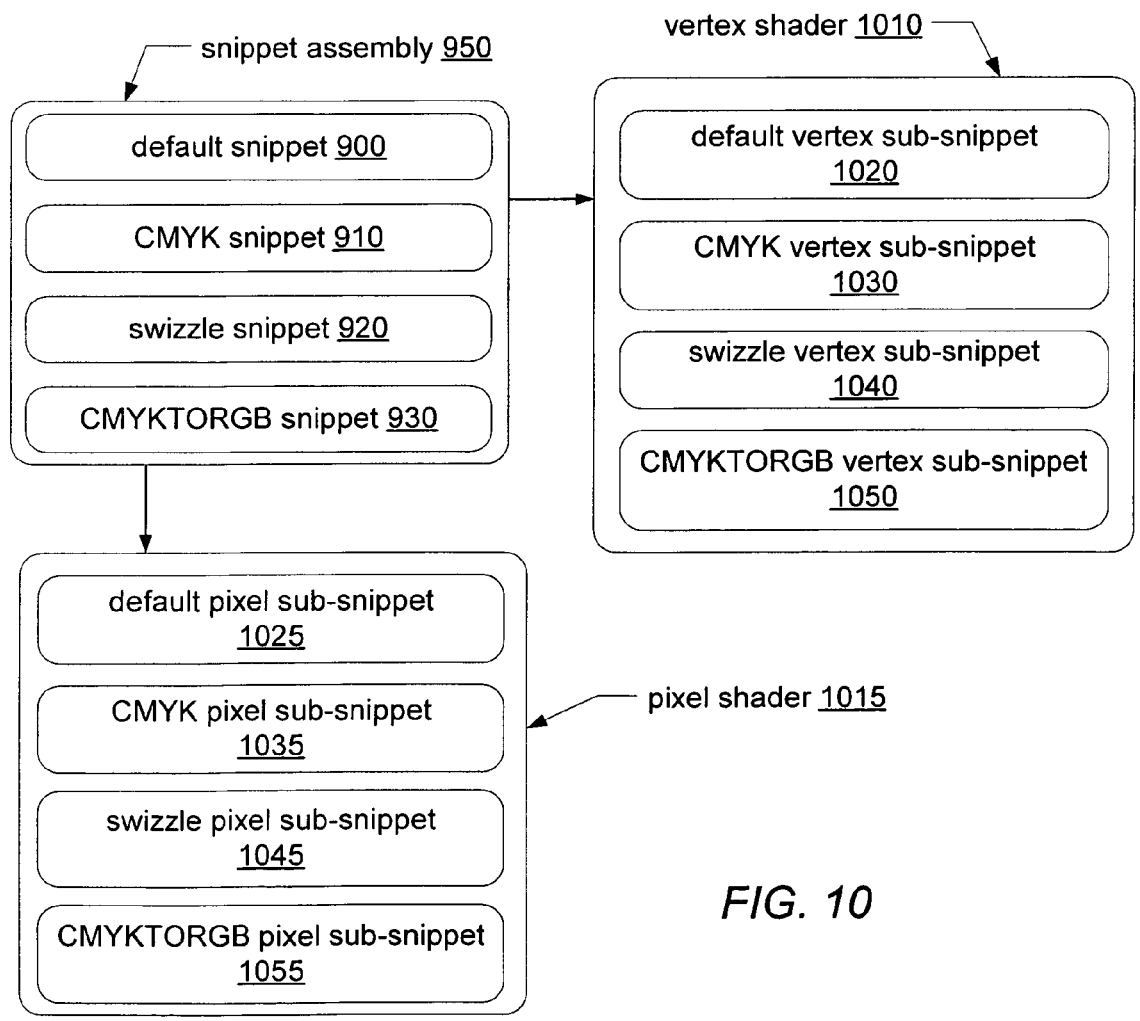
FIG. 10 is a block diagram illustrating vertex and pixel shaders that include multiple sub-snippets, according to one embodiment.

FIG. 9 is a block diagram illustrating, in one embodiment, a snippet assembly of four snippets. As described above, snippet assemblies may be defined that combine multiple snippets. For example, snippet assembly 950 may include default snippet 900, CMYK snippet 970, swizzle snippet 980 and CMYKTORGB snippet 990. Thus, snippet assembly 950, once executed as shader programs, may perform the combined functionality of the individual snippets. Additionally, since, as noted above, each snippet may contain sub-snippets, such as a vertex sub-snippet and a pixel sub-snippet, snippet assembly 950 may include multiple sub-assemblies that include the appropriate sub-snippets. For example, as illustrated in FIG. 10, vertex shader 1010, which corresponds to a vertex sub-assembly of snippet assembly 950 includes the vertex sub-snippets of the four snippets in snippet assembly 950. Thus, while snippet assembly 950 includes default snippet 900, CMYK snippet 970, swizzle snippet 980 and CMYKTORGB snippet 990, vertex shader 1010 includes default vertex sub-snippet 1020, CMYK vertex sub-snippet 1030, swizzle vertex sub-snippet 1040 and CMYKTORGB vertex sub-snippet 1050. Similarly, pixel shader 1015, which corresponds to a pixel sub-assembly of snippet assembly 950 includes default pixel sub-snippet 1025, CMYK pixel sub-snippet 1035, swizzle pixel sub-snippet 1045, and CMYKTORGB pixel sub-snippet 1055. In other words, pixel shader 1015 includes the pixel sub-snippets of the snippets included in snippet assembly 950.

Figure 11:
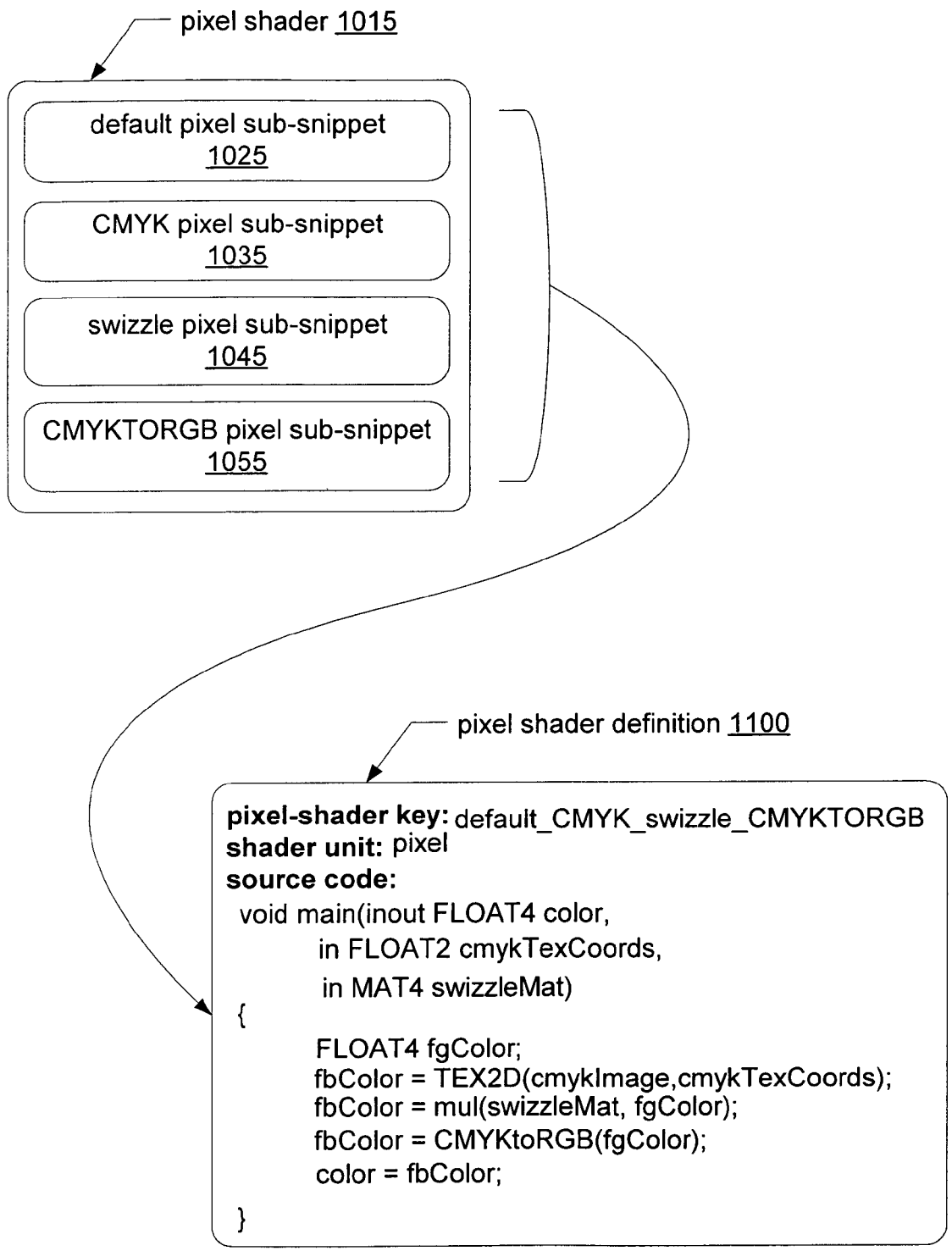
FIG. 11 is a block diagram illustrating a pixel shader program corresponding to a pixel sub-assembly, according to one embodiment.

Moreover, the logical sub-assemblies correspond to shader programs that will be generated using the snippets and sub snippets. For instance, FIG. 11 is a block diagram illustrating a pixel shader program corresponding to a pixel sub-assembly, according to one embodiment. In order to generate a pixel shader program from the four individual pixel sub-snippets associated with snippet assembly 950, a new function, such as the function "main" illustrated in pixel shader source 1110 in FIG. 11, may be created. The new function of the pixel shader program, such as "main", may call the individual functions of the sub-snippets included in the shader program. Thus, as illustrated in FIG. 11, the function main in pixel shader source 110 calls the function "TEX2D", which in this example is the function that defines the CMYK pixel sub-snippet 1035. Similarly, pixel shader source 1100 also calls the functions "mul" and "CMYKtoRGB" which are defined in the swizzle pixel sub-snippet 1045 and CMYKTORGB pixel sub-snippet, respectively. The default pixel sub-snippet 1025 may define the variable fgColor initialized in pixel shader source 1100, according to some embodiments. Thus, a pixel shader program includes calling the individual functions of the sub-snippets.

In some embodiments, a developer may write the code for the main function of a shader program. In other embodiments, however, snippet framework 120 may be configured to generate the source code for a shader program based on the source code and functional descriptions of the individual sub-snippets combined together into the shader program. Additionally, the source code used to define the main function of a shader program may be written using an abstraction of multiple programming shader language as described above regarding the axial sub-snippets of FIG. 8. Thus, snippet framework 120 may be configured to directly use language elements, such as variable, function call, etc., that are directly supported by all targeted shader programming language (e.g. platform APIs). Snippet framework 120 may also be configured to use a coding convention, such as using all capitals, to differentiate between language elements directly supported by the multiple shader programming languages and those language elements supported differently by the different shader programming languages.

Snippet framework 120 may also be configured to use a standard naming convention for shader programs. For example, as illustrated in FIG. 11, pixel shader 1015 includes four pixel sub-snippets—default, CMYK, swizzle, and CMYKTORGB. In one embodiment, the pixel shader may be identified as the concatenation of the names of the individual sub-snippets (also the names of the snippets) included in the snippet assembly. Thus, as illustrated in FIG. 11, pixel shader definition 1100 may be identified as "default_CMYK_swizzle_CMYKTORGB". This same identification may be used to locate the pixel shader program subsequently by an application to load and execute this particular program shader. For example, the pixel shader program may be stored in an array of shader programs and the identification "default_CMYK_swizzle_CMYKTORGB" may be used to locate the shader program in the array or may be used as a key to other index tables containing information for or about the pixel shader, such as parameter information, etc.

Thus, snippet framework 120 may be configured to generate pixel shader programs, including source code for particular functions, such as "main", for every snippet assembly. Additionally, since every snippet may include multiple sub-snippets supporting different programming units of a GPU, snippet framework 120 may be configured to generate multiple shader programs, such as both a vertex and a pixel program, for every snippet assembly. As described above and illustrated in the various figures, snippet framework 120 may combine all sub-snippets of a single type (e.g., pixel, vertex, etc) from a snippet assembly and generate a shader program from them, according to some embodiments.

Figure 12:
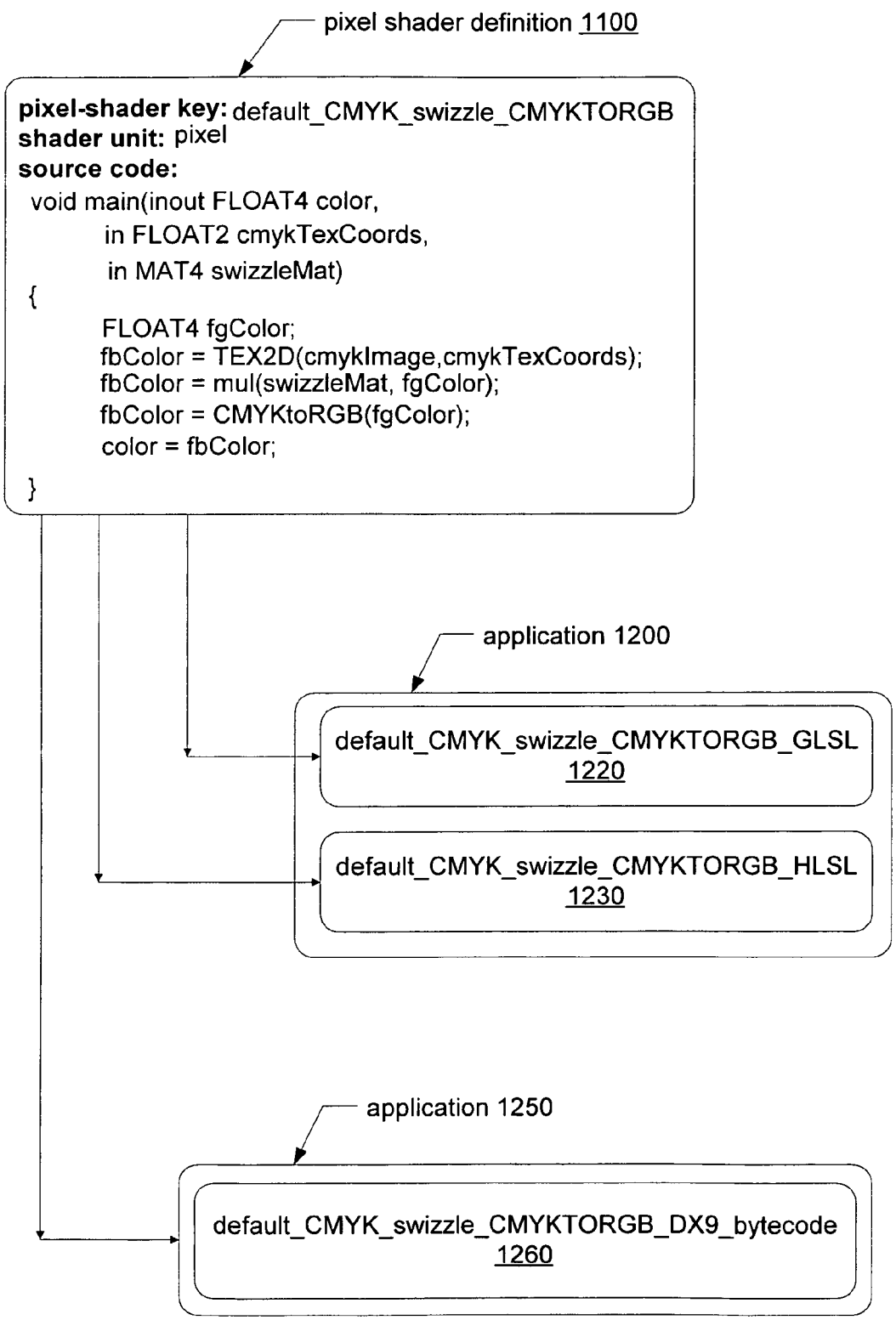
FIG. 12 is a block diagram illustrating different shader programs generated to support different applications, in one embodiment.

As noted above, snippet framework 120 may be configured to generate different versions of shader programs for different shader programming languages. Additionally, snippet framework 120 may also be configured to generate both uncompiled source code and/or compiled byte code for shader programs. For example, FIG. 12 is a block diagram illustrating different shader programs generated to support different applications, in one embodiment. Thus, in one embodiment, snippet framework 120 may generate three different versions of pixel shader 1015 using pixel shader definition 1100. For example, a user may have specified that application 1200 should support two shader programming languages, such as GLSL and HLSL, and that application 1250 should support one shader programming language, such as DirectX version 9. The user may also have indicated that the shader programs for application 1250 should be precompiled and made available as byte code for the application to load directly onto the GPU. Thus, snippet framework 120 may translate the abstraction-based pseudo-code from the definition of pixel shader "default_CMYK_swizzle_CMYKTORGB" into language specific versions supporting GLSL, HLSL and DirectX version 9. As noted above, in one embodiment, snippet framework 120 may be configured to use some source code language elements from the shader program definitions directly if those language elements are supported directly in all of the target shader program languages. Additionally, snippet framework 120 may be configured to translate other language elements supported differently in different shader programming languages, such as those in all capitals according to one embodiment, into language specific source code language elements, such as variables, function names, etc.

Snippet framework 120 may then compile the DirectX version of the shader program and store the resulting byte code for use by application 1250. As noted above, in some embodiments, the final versions of the shader programs may be stored in source code files to be compiled with an application, such as in header files, resources, code images, etc. In other embodiments, the shader programs may be stored in separate files not compiled into an application but made available to the application.

At runtime, an application, such as applications 1200 and 1250 may load individual shader programs, or more likely set of associated shader programs (such as both a pixel and a vertex shader program) to execute on the GPU. Thus, application 1250 may load the "default_CMYK_swizzle_CMYKTORGB_DX9_bytecode" version of the default_CMYK_swizzle_CMYKTORGB pixel shader program and execute it on the GPU. Application 1200, on the other hand, may load either the default_CMYK_swizzle_CMYKTORGB GLSL or the default_CMYK_swizzle_CMYKTORGB_HLSL version of the shader program depending upon whether the GLSL or the HLSL version is needed. As noted above, different versions may be required either to support different GPU hardware or for other reasons, such as user specification. Since, as noted above, snippet framework 120 may have only generate source code versions of the default_CMYK_swizzle_CMYKTORGB shader program to application 1200, application 1200 may be configured to compile the shader program and then load it on the GPU for execution.

Thus, in some embodiments, the final graphics application may also include, and snippet framework 120 may supply, functionality for compiling shader programs at runtime. Additionally, while described herein mainly in terms of snippet framework 120 defining snippets, snippet assemblies and shader programs ahead of time and supplied the final shader programs to an application prior to the application being executed, in some embodiments, functionality of snippet framework 120 may be included in or available to applications at runtime. For example, while some applications may have a known set of possible shader programs required by the application, other applications may not. For instance, an application that allows the user to design shader programs for use by the application, such as a drawing or graphic development application, may not have a definite known set of required shader programs. Such an application may, in some embodiments, include or have access to snippet framework 120 at runtime. Accordingly, an application may, at runtime, define (such as by allowing a user to define) one or more new snippets, combine those snippets into snippet assemblies, have snippet framework 120 generate appropriate shader programs and then execute those shader programs on the GPU.

Figure 13:
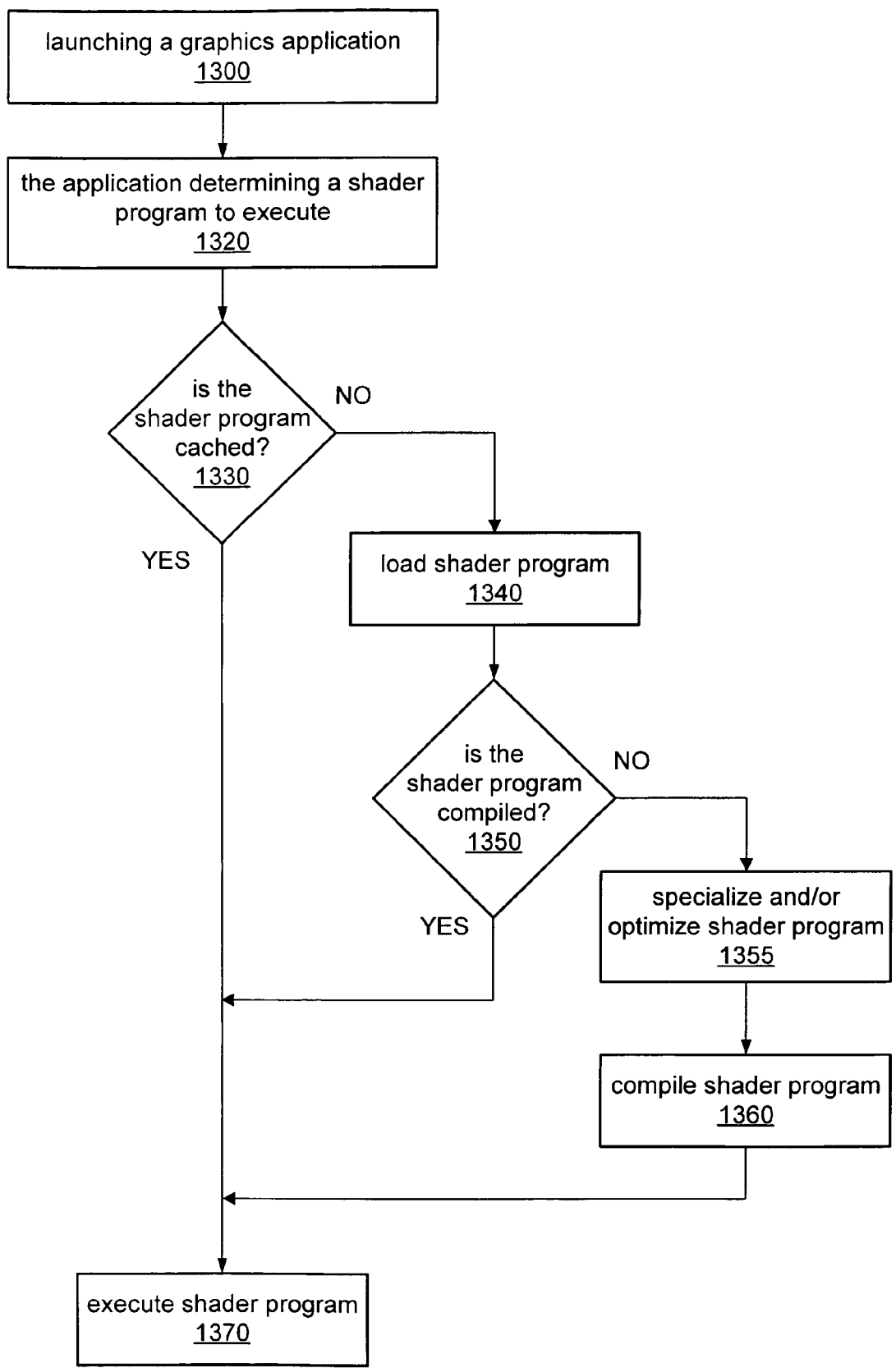
FIG. 13 is a flowchart illustrating one embodiment of a method for loading and executing a shader program, as described herein.

Additionally, the functionality to load, cache, bind, parameterize and execute (or draw) shader programs at runtime may be provided by snippet assembly framework 120 or snippet execution framework 125. For example, as described above, snippet execution framework 125 may provide objects and/or object templates configured to load various shader programs, as well as caching, binding, parameterizing and executing the loaded shader programs. For example, FIG. 13 is a flowchart illustrating one embodiment of a method for loading and executing a shader program, as described herein. Thus, as illustrated by blocks 1300 and 1320, a graphics application configured to utilize shader programs generated by snippet assembly framework 120 maybe launched and may determine a particular shader program to execute. For example, snippet execution framework 125 may be part of or available to the graphics application and may provide functionality to determine what type of GPU hardware is available and what type of shader programming language is supported. Therefore, in addition to determining what sort of shader program to execute (e.g. what sort of shader task is required), the application and/or snippet execution framework 125, may also determine which version of the shader program to use.

For example, snippet execution framework 125 may determine that the GLSL version of the default_CMYK_swizzle_CMYKTORGB shader program should be used. Snippet execution framework 125 may then determine whether or not that version of the shader program was used previously and therefore in the current cache of shader programs, as indicated by decision block 1330. If the appropriate version of the shader program is available in the cache, snippet execute framework 125 may load the shader program from the cache and execute on the GPU hardware, as indicated by block 1370. If however, the appropriate version of the shader program is not available in the cache, as indicated by the negative output from decision block 1330, snippet execution framework 125 may load the shader program, as indicated by block 1340. When loading a shader program, snippet execution framework 125 may locate the correct version of the shader program by using a look table or other indexing mechanism. After loading the particular version of the shader program, snippet execution framework 125 may determine whether the shader program is compiled or not, as indicated by decision block 1350. In some embodiments, snippet execution framework 125 may be able to determine from the naming or identification of the shader program whether or not it is compiled. In other embodiments, a separate lookup table or other metadata about the shader program may indicate whether or not it is compiled. If, as indicated by the positive output of decision block 1350, the shader program is compiled, snippet execution framework 125 may then proceed to execute the program, as indicated by block 1370. If, however, the shader program is not compiled, as indicated by the negative output of decision block 1350, snippet execution framework 125 may be configured to compile the shader program, as indicated by block 1360, possibly after applying one or more specializations or optimizations, as indicated by block 1355.

In some embodiments, the application and/or snippet execution framework 125 may be configured to apply one or more specialization options when compiling a shader program, as illustrated by block 1355. For example, various options and/or optimizations regarding specific GPU capabilities may be applied before compiling the shader program. For instance, in one embodiment, the source code for the shader program may be modified, such as to optimize performance on a particular GPU. In other embodiments, the timing of execution for different portions of the shader program may be optimized. For example, the timing of data conversions between data types may be delayed (or advanced) in order to take advantage of (or to compensate for) GPU specific capabilities and/or liabilities. Additionally, different compiler options and/or pre-processing commands may be used when compiling the shader program for execution on different GPUs or based on other system considerations, according to some embodiments. In general, any sort of optimization and/or specialization of the source code, compiler options, and/or pre-compiler command may be performed when compiling the shader program at runtime. While in some embodiments, such optimizations and specializations may be performed automatically by the application and/or snippet execution framework 125, in other embodiments, they may be performed at user request, or snippet execution framework 125 may be configured to allow a user to modify the source code, compiler options and/or pre-compiler commands for a shader program at runtime.

After loading and compiling the shader program if necessary, snippet execution framework 120 may be configured to execute the shader program, as indicated by block 1370. In some embodiments, executing the shader program may involve properly binding and parameterizing the shader program for execution on the GPU. Binding and parameterizing the shader program ensures that the proper data is available to the executing shader program.

The generation and use of shader snippets, sub-snippets, snippet assemblies and shader programs, as described herein may be implemented on various types of computer systems. Referring again to FIG. 1, computer system 1400 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, or in general any type of computing device.

The snippet assembly framework 120 and the snippet execution framework 125 described herein may be provided as a computer program product, or software, that may include a computer-readable storage medium having stored thereon instructions, which may be used to program a computer system (or other electronic devices) to implement a shader snippet framework as described herein. A computer-readable storage medium includes any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

A computer system 1400 may include a processor unit (CPU) 1430 (possibly including multiple processors, a single threaded processor, a multi-threaded processor, a multi-core processor, or other type of processor). The computer system 1400 may also include one or more system memories 1410 (e.g., one or more of cache, SRAM DRAM, RDRAM, EDO RAM, DDR RAM, SDRAM, Rambus RAM, EEPROM, or other memory type), an interconnect 1440 (e.g., a system bus, LDT, PCI, ISA, or other bus type), and a network interface 1050 (e.g., an ATM interface, an Ethernet interface, a Frame Relay interface, or other interface). The memory medium 1410 may include other types of memory as well, or combinations thereof. Embodiments of the shader snippet framework described herein may include fewer or additional components not illustrated in FIG. 1 (e.g., video cards, audio cards, storage devices, additional network interfaces, peripheral devices, or other components). The CPU 1430, the network interface 1050, and the memory 1410 may be coupled to the interconnect 1440. It should also be noted that one or more components of system 1400 might be located remotely and accessed via a network. One or more of the memories 1410 may embody a snippet assembly framework 120 and/or may embody a snippet execution framework 125.

In some embodiments, memory 1410 may include program instructions configured to implement a shader snippet framework 120, as described herein. Snippet assembly framework 120 and/or snippet execution framework 125 may be implemented in any of various programming languages or methods. For example, in one embodiment, snippet assembly framework 120 and/or snippet execution framework 125 may be JAVA based, while in another embodiments, it may be implemented using the C or C++ programming languages. In other embodiments, snippet assembly framework 120 and/or snippet execution framework 125 may be implemented using specific graphic languages specifically for developing programs executed by specialize graphics hardware, such as GPU 1460. In addition, snippet assembly framework 120 and/or snippet execution framework 125 may be embodied on memory specifically allocated for use by graphics processor(s) 1460, such as memory on a graphics board including graphics processor(s) 1460. Thus, memory 1410 may represent dedicated graphics memory as well as general purpose system RAM. Alternately, memory 1410 may represent video memory that includes a frame buffer 130.

Network interface 1450 may be configured to enable computer system 1400 to communicate with other computers, systems or machines, such as across a network. Network interface 1450 may use standard communications technologies and/or protocols. Network interface 1450 may utilize links using technologies such as Ethernet, 802.11, integrated services digital network (ISDN), digital subscriber line (DSL), and asynchronous transfer mode (ATM) as well as other communications technologies. Similarly, the networking protocols used on network 100 may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over network 100 by network interface 1450 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

While the shader snippet framework has been described with reference to various embodiments, it will be understood that these embodiments are illustrative and that the scope of the document-based data collection system is not limited to them. Many variations, modifications, additions, and improvements are possible. More generally, the present shader snippet framework is described in the context of particular embodiments. For example, the blocks and logic units identified in the description are for ease of understanding and not meant to limit the shader snippet framework to any particular embodiment. Functionality may be separated or combined in blocks differently in various realizations or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A computer-implemented method, comprising:
   defining a plurality of shader snippets, wherein each snippet comprises a plurality of sub-snippets, wherein each sub-snippet comprises a plurality of instructions implementing a particular shader task and one or more parameters for executing the particular shader task on a particular one of a plurality of processing units of a graphics processing unit (GPU), and wherein each sub-snippet of a particular shader snippet is configured to execute on a different one of the processing units;
   defining one or more snippet assemblies, wherein each snippet assembly specifies a combination of multiple ones of the plurality of shader snippets and an order in which to execute the combination of shader snippets on the GPU;
   defining a plurality of target platform application programming interfaces (APIs) according to which the shader snippets should be executed on the GPU; and
   for each of the one or more snippet assemblies, generating a set of shader program code according to each of the plurality of target platform APIs for each of the plurality of processing units of the GPU for which a corresponding sub-snippet is included in one of the snippets of the respective assembly.

2. The method of claim 1, wherein said generating a set of shader program code comprises generating executable byte code.

3. The method of claim 1, wherein said generating a set of shader program code comprises generating source code according to one of the one or more target platform APIs.

4. The method of claim 1, further comprising generating a snippet store comprising definitions of the plurality of shader snippets.

5. The method of claim 1, further comprising generating one or more shader program objects, wherein each shader program object comprises a computer language object configured to instantiate and execute a respective one of the sets of shader program code.

6. The method of claim 5, wherein said generating one or more shader program objects comprises generating a file comprising source code defining one or more computer language object templates from which the shader program objects are derived.

7. The method of claim 5, further comprising a graphics application instantiating and executing at least one of the shader program objects.

8. The method of claim 7, further comprising the instantiated shader program object instantiating and executing one of the sets of shader program code on the GPU.

9. The method of claim 8, further comprising the instantiated shader program object compiling the set of shader program code.

10. The method of claim 1, wherein said defining a plurality of shader snippets comprises receiving user specified information identifying the plurality of shader snippets and the respective particular shader tasks.

11. The method of claim 1, wherein said defining one or more snippet assemblies comprises receiving user specified information identifying each of the respective combinations of shader snippets independently of any shader language in which the shader snippets may be implemented.

12. A system, comprising:
   a processor; and
   memory coupled to the processor, wherein the memory comprises program instructions executable by the processor to:
      generate a snippet store comprising computer source code configured to implement a plurality of shader snippets, wherein each snippet comprises a plurality of sub-snippets, wherein each sub-snippet specifies a particular shader task and one or more parameters for executing the particular shader task on a particular one of a plurality of processing units of a graphics processing unit (GPU), and wherein each sub-snippet of a particular shader snippet is configured to execute on a different one of the processing units;
      generate a plurality of computer language shader objects each configured to execute on the processor to initiate the execution of sub-snippets from a combination of the snippets of the snippet store as a shader program on the GPU.

13. The system of claim 12, wherein the snippet store comprises, for each respective snippet:
   one or more implementations of the respective snippet for a respective one or more shader languages; and
   one or more parameter definitions for the respective snippet and corresponding to the respective one or more shader languages.

14. The system of claim 12, wherein to generate the snippet store the program instructions are further executable to generate the snippet store according to user specified information indicating:
   the plurality of snippets;
   the respective one or more parameters for each sub-snippet of each of the plurality of snippets; and
   a plurality of snippet assemblies, wherein each snippet assembly comprises a combination of the plurality of snippets.

15. The system of claim 12, wherein to generate the snippet store the program instructions are further executable to generate byte code implementations for one or more of the plurality of shader snippets.

16. The system of claim 12, wherein to generate the snippet store the program instructions are further executable to generate source code implementations for one or more of the plurality of shader snippets according to one or more of the target platform APIs.

17. The system of claim 12, wherein to generate the snippet store the program instructions are further executable to generate source code configured to implement one or more of the plurality of shader snippets in shader programming languages configured for implementing code for execution on the GPU, wherein the generated source code is independent of the shader programming language.

18. The system of claim 17, wherein the generated source code comprises:
   source code common to a plurality of the shader programming languages; and pseudo code representing language elements not common to the plurality of shader programming languages.

19. The system of claim 12, wherein to generate the plurality of computer language shader objects the program instructions are further executable to generate a file comprising source code defining one or more computer language object templates from which the shader objects are derived, wherein the object templates are configured to load and execute shader programs corresponding to sub-snippets from combinations of the plurality of snippets.

20. A system, comprising:
a processor;
a memory coupled to the processor; and
a graphics processing unit (GPU);
wherein the memory comprises program instructions executable on the processor to implement an application comprising:
a snippet store; and
one or more shader objects;
wherein the snippet store comprises a plurality of shader snippets, each indicating a particular shader task and one or more parameters for performing the particular shader task on the GPU, wherein each of the shader snippets comprises a plurality of sub-snippets specifying a portion of the particular shader task on a particular one of a plurality of processing units of the GPU, and wherein each sub-snippet of a particular shader snippet is configured to execute on a different one of the processing units;
wherein each of the shader objects is configured to instantiate a shader program corresponding to sub-snippets from a combination of a plurality of the snippets and to execute the shader program on the plurality of processing units of the GPU using the one or more parameters.

21. The system of claim 20, wherein the snippet store comprises, for each of the one or more shader snippets, a sub-snippet definition for each sub-snippet of the one or more shader snippets.

22. The system of claim 21, wherein each shader program is further configured to be compiled, wherein the shader program comprises source code according to a shader programming language.

23. A computer-implemented method, comprising:
instantiating one or more shader objects on a central processing unit (CPU) of a computer, wherein each shader object is a computer language object configured to instantiate and execute a shader program on a graphics processing unit (GPU) of the same computer corresponding to a sequence of a plurality of shader snippet objects from a snippet store, wherein the snippet store comprises a plurality of shader snippets, each indicating a particular shader operation and one or more parameters for performing the particular operation on the GPU according to a particular shader platform application programming interface (API), wherein the GPU is distinct from the CPU;
executing the one or more shader objects on the CPU; and
each of the one or more shader objects initiating the execution of a respective shader program on the GPU.

24. The method of claim 23, wherein said instantiating one or more shader objects comprises instantiating a plurality of shader objects and wherein said executing the one or more shader objects comprises each of the plurality of shader objects executing the respective combination of shader snippet objects on a respective one of a plurality of shader processors of the GPU in parallel.

25. A computer-readable storage medium, comprising program instructions executable to implement:
defining a plurality of shader snippets, wherein each snippet comprises a plurality of sub-snippets, wherein each sub-snippet comprises a plurality of instructions implementing a particular shader task and one or more parameters for executing the particular shader task on a particular one of a plurality of processing units of a graphics processing unit (GPU), and wherein each sub-snippet of a particular shader snippet is configured to execute on a different one of the processing units;
defining one or more snippet assemblies, wherein each snippet assembly specifies a combination of multiple ones of the plurality of shader snippets and an order in which to execute the combination of shader snippets on the GPU;
defining a plurality of target platform application programming interfaces (APIs) according to which the shader snippets should be executed on the GPU; and
for each of the one or more snippet assemblies, generating a set of shader program code according to each of the plurality of target platform APIs for each of the plurality of processing units of the GPU for which a corresponding sub-snippet is included in one of the snippets of the respective assembly.

* * * * *